(12) United States Patent
Otsuka

(10) Patent No.: US 12,294,706 B2
(45) Date of Patent: May 6, 2025

(54) IMAGE DATA TRANSFER APPARATUS, IMAGE DISPLAY SYSTEM, AND IMAGE TRANSFER METHOD

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 324 days.

(21) Appl. No.: 17/907,834

(22) PCT Filed: Mar. 18, 2021

(86) PCT No.: PCT/JP2021/011134
§ 371 (c)(1),
(2) Date: Aug. 29, 2022

(87) PCT Pub. No.: WO2021/193361
PCT Pub. Date: Sep. 30, 2021

(65) Prior Publication Data
US 2023/0142944 A1    May 11, 2023

(30) Foreign Application Priority Data
Mar. 25, 2020  (JP) .................. 2020-053773

(51) Int. Cl.
*H04L 67/61* (2022.01)
*G06F 3/14* (2006.01)
(Continued)

(52) U.S. Cl.
CPC ......... *H04N 19/129* (2014.11); *G06F 3/1446* (2013.01); *G09G 5/36* (2013.01); *H04N 19/119* (2014.11); *H04N 19/174* (2014.11)

(58) Field of Classification Search
CPC ........................................ H04L 67/61
(Continued)

(56) References Cited

U.S. PATENT DOCUMENTS

| 10,045,017 | B2 | 8/2018 | Schierl | |
| 2004/0003117 | A1* | 1/2004 | McCoy | H04L 67/568 |
| | | | | 709/246 |

(Continued)

FOREIGN PATENT DOCUMENTS

| JP | 2000152069 A | 5/2000 |
| JP | 2004165746 A | 6/2004 |

(Continued)

OTHER PUBLICATIONS

Notice of Reasons for Refusal for corresponding JP Application No. 2020-053773, 14 pages, dated May 26, 2023.
(Continued)

*Primary Examiner* — Jeffery A Williams
(74) *Attorney, Agent, or Firm* — Kilpatrick Townsend & Stockton LLP

(57) ABSTRACT

In a server, an image generation section stores a generated image in a frame buffer. A compression/encoding section compresses and encodes image data in units of partial images smaller than one frame. A processing order control section, on the basis of information pertaining to a scan order for a display panel connected to an image processing apparatus which is a data transmission destination, controls an order of reading out pixel data from the frame buffer, a shape of a partial image, or a compression and encoding order. The compressed and encoded partial image data is packetized by a packetization section and transmitted to the image processing apparatus by a communication section.

16 Claims, 16 Drawing Sheets

(51) Int. Cl.
  *G09G 5/36*      (2006.01)
  *H04N 19/119*    (2014.01)
  *H04N 19/129*    (2014.01)
  *H04N 19/174*    (2014.01)

(58) Field of Classification Search
  USPC .................................................. 375/240.02
  See application file for complete search history.

(56) References Cited

U.S. PATENT DOCUMENTS

2009/0077605 A1*  3/2009  Kurita ................. H04N 21/643
                                                725/116
2014/0286440 A1   9/2014  Apte
2015/0023409 A1   1/2015  Schierl
2019/0043223 A1   2/2019  Gao

FOREIGN PATENT DOCUMENTS

JP    2015516747 A    6/2015
WO    2019097319 A1   8/2019

OTHER PUBLICATIONS

International Search Report for corresponding PCT Application No. PCT/JP2021/011134, 4 pages, dated Jun. 15, 2021.
Decision to Grant a Patent for corresponding JP Application No. 2020-053773, 14 pages, dated Nov. 7, 2023.

* cited by examiner

FIG. 13
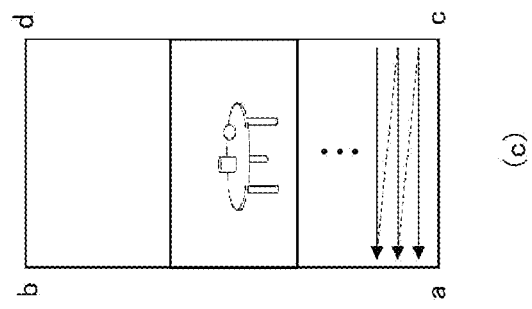
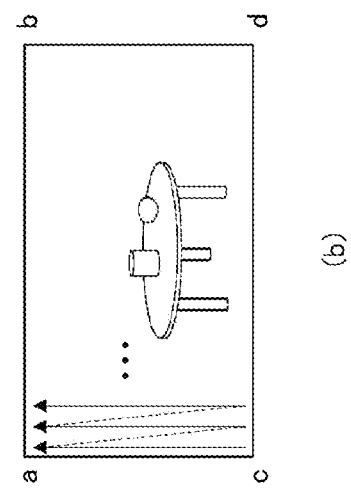
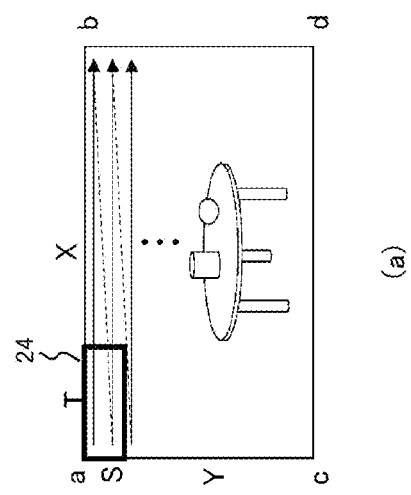

IMAGE DATA TRANSFER APPARATUS, IMAGE DISPLAY SYSTEM, AND IMAGE TRANSFER METHOD

TECHNICAL FIELD

This invention pertains to an image data transfer apparatus that processes data for a moving image to be displayed and an image transfer method.

BACKGROUND ART

Due to improvements to information processing technology or image display technology in recent years, it has become possible to experience a video world in various modes. For example, by causing a head-mounted display to display a panorama video and display an image corresponding to a user's line of sight, it is possible to increase a sense of immersion into the video world or improve the operability of an application such as a game. In addition, image data subjected to a streaming transfer from a server having abundant resources is caused to be displayed, whereby a user can enjoy a high-definition moving image or game screen regardless of place or scale.

SUMMARY

Technical Problems

In techniques for causing a client terminal to immediately display image data transferred via a network, delay time due to communication between the client terminal and a server can become a problem. For example, in a case of causing a user operation on the client terminal side to be reflected to a display image, data will need to go back and forth, such as transmission of the user operation to the server and transmission of image data from the server to the client terminal, and thus it may be that delay time which cannot be overlooked arises. In a case where a head-mounted display is a display destination, consideration can be given to display being delayed with respect to motion of a user's head, whereby a sense of actually being there is impaired or visually induced motion sickness is caused. This problem is more likely to become apparent the more high image quality is pursued.

The present invention is made in the light of such problems, and an objective of the present invention is to provide a technique that enables both image quality and a reduction of delay time to be established, in image display accompanying data transmission that uses communication.

Solution to Problems

In order to solve the above-mentioned problems, one aspect of the present invention pertains to an image data transfer apparatus. This image data transfer apparatus is characterized by being an image data transfer apparatus that transfers data for a moving image to a client terminal, and includes a drawing section that generates data for a frame included in the moving image and writes the data to a memory, a display method information obtainment section that obtains information pertaining to a scan order for a display panel connected to the client terminal, a compression/encoding section that reads out pixel data for the frame from the memory in an order based on the information pertaining to the scan order and compresses and encodes the pixel data, and a communication section that performs a streaming transfer of compressed and encoded frame data to the client terminal.

Another aspect of the present invention pertains to an image display system. This image display system is characterized by being an image display system that includes a server that transfers data for a moving image, and a client terminal that receives the data for the moving image and causes a display panel to display the data for the moving image. The client terminal is provided with a display method obtainment section that obtains information pertaining to a scan order for a display panel connected to the client terminal and that transmits the information to the server, and the server is provided with a drawing section that generates data for a frame included in the moving image and writes the data to a memory, a display method information obtainment section that obtains information pertaining to the scan order, a compression/encoding section that reads out pixel data for the frame from the memory in an order based on the information pertaining to the scan order and compresses and encodes the pixel data, and a communication section that performs a streaming transfer of compressed and encoded frame data to the client terminal.

Yet another aspect of the present invention pertains to an image data transfer method. This image data transfer method is characterized by including, by an image data transfer apparatus that transfers data for a moving image to a client terminal, a step of generating data for a frame included in the moving image and writing the data to a memory, a step of obtaining information pertaining to a scan order for a display panel connected to the client terminal, a step of reading out pixel data for the frame from the memory in an order based on the information pertaining to the scan order and compressing and encoding the pixel data, and a step of performing a streaming transfer of compressed and encoded frame data to the client terminal.

Note that any combination of the above components or a representation of the present invention may be mutually converted between a method, an apparatus, a system, a computer program, a data structure, a recording medium, etc., which are effective as aspects of the present invention.

Advantageous Effect of Invention

By virtue of the present invention, it is possible to establish both image quality and a reduction of delay time in image display accompanying data transmission that uses communication.

BRIEF DESCRIPTION OF DRAWINGS

FIG. 13 depicts views for describing parameters obtained by a handshake between the server and the image processing apparatus in the present embodiment.

DESCRIPTION OF EMBODIMENTS

Figure 1:
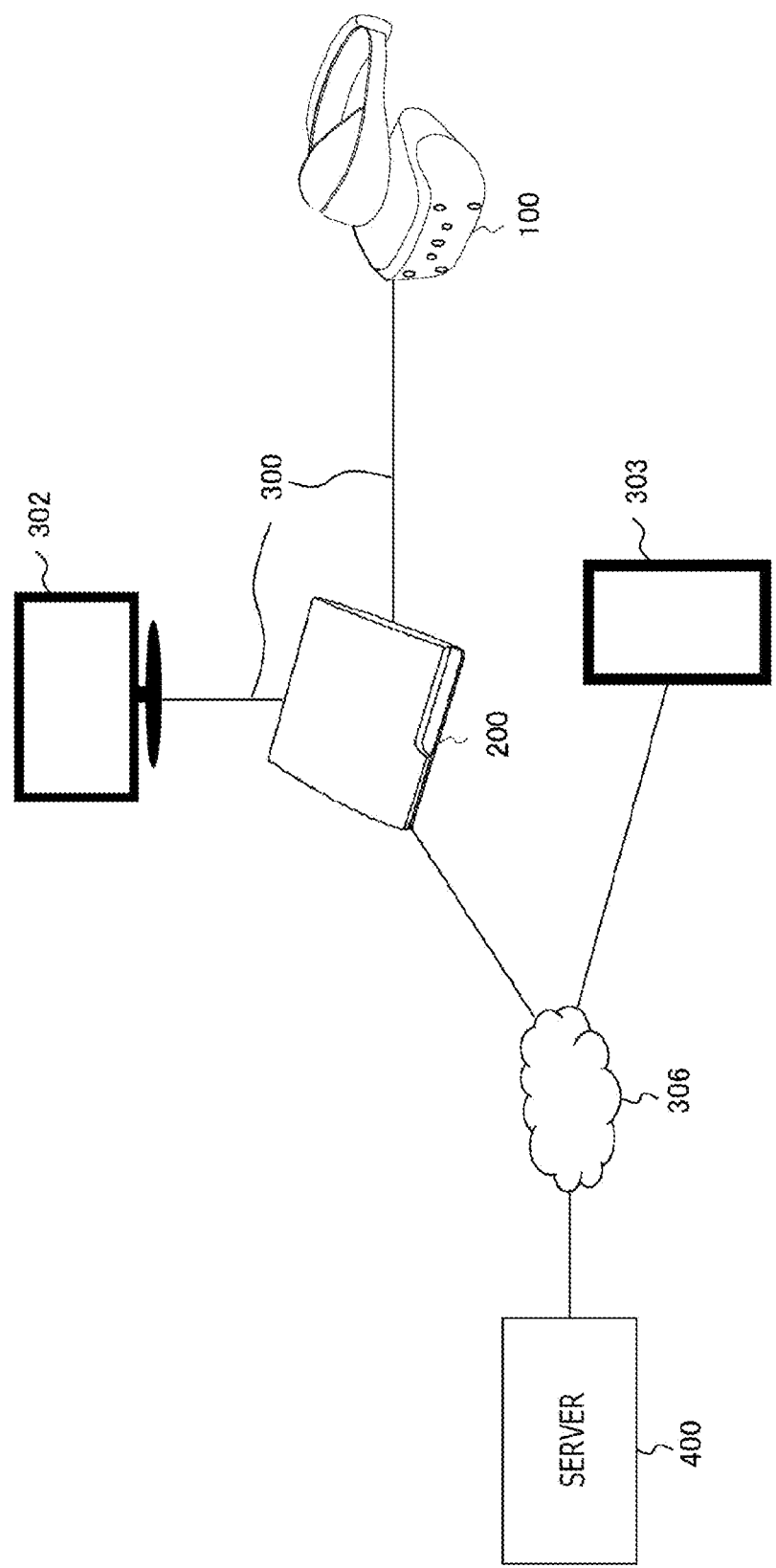
FIG. 1 is a view that illustrates an example of a configuration of an image processing system in the present embodiment.

FIG. 1 illustrates an example of a configuration of an image processing system in the present embodiment. An image display system 1 includes an image processing apparatus 200, a head-mounted display 100, a flat panel display 302, a portable terminal 303, and a server 400. The image processing apparatus 200 is connected to the head-mounted display 100 and the flat panel display 302 by wireless communication or an interface 300 such as USB (Universal Serial Bus) Type-C or HDMI (High-Definition Multimedia Interface) (registered trademark). The image processing apparatus 200 and the portable terminal 303 are connected to the server 400 via a network 306 such as the internet or a LAN (Local Area Network).

The server 400, as an image data transfer apparatus, generates at least a portion of an image to be displayed and transmits the at least a portion of the image to be displayed to the image processing apparatus 200 and the portable terminal 303. Here, the server 400 may be a server for a company, etc., that provides various distribution services such as a cloud game, or may be, for example, a home server that transmits data to any terminal. Accordingly, the scale of the network 306 is not limited to a LAN, a public network such as the internet, etc. For example, the network 306 may go through a mobile phone carrier network, a Wi-Fi (Wireless Fidelity) spot within a town, or a Wi-Fi access point in a home. Alternatively, the image processing apparatus 200 or the portable terminal 303 may be directly connected to the server 400 through a video interface.

The image processing apparatus 200 performs necessary processing on image data transmitted from the server 400, and outputs the processed image data to at least any one of the head-mounted display 100 and the flat panel display 302. For example, the server 400 receives, from a plurality of image processing apparatuses 200 connected to respective head-mounted displays 100, head motion or user operations performed by a plurality of users who have each mounted a head-mounted display 100. A virtual world caused to change in response to a user operation is drawn in a field of view corresponding to the head motion performed by each user, and subsequently transmitted to the respective image processing apparatuses 200.

The image processing apparatus 200 outputs the transmitted image data to the head-mounted display 100 or the flat panel display 302 at an appropriate timing, after converting the transmitted image data to a format suitable for the head-mounted display 100 or the flat panel display 302 if necessary. The portable terminal 303 is a device such as a portable game console, an advanced-functionality mobile phone, or a tablet terminal, has functionality similar to that of the image processing apparatus 200, and is also integrally provided with a display panel.

Subsequently, an image processing module incorporated in the portable terminal 303 is also described as the "image processing apparatus 200." The image processing apparatus 200 may output an image transmitted from the server 400 to a connected display panel, after compositing a separately prepared UI (User Interface) plane image (also referred to as an OSD (On Screen Display) plane image) or an image captured by a camera provided in the head-mounted display 100, etc., onto the image transmitted from the server 400.

The image processing apparatus 200 that has the head-mounted display 100 as an output destination may correct the image transmitted from the server 400, on the basis of the position or the orientation of the head-mounted display 100 immediately before display to thereby increase display followability with respect to head motion. The image processing apparatus 200 may also cause the flat panel display 302 to display an image with a similar field of view to thereby make it possible for other people to see what kind of image the user who has mounted the head-mounted display 100 is viewing.

However, in the present embodiment, details of a moving image to be displayed or a display destination thereof are not particularly limited to any kind. For example, the server 400 may set an image captured by an unillustrated camera as to be displayed, and subject the image to live distribution to the image processing apparatus 200. At this time, the server 400 may obtain a multi-view image resulting from capturing an event venue such as a sports competition or a concert by a plurality of cameras and use this to create an image for a field of view that corresponds to motion of the head-mounted display 100 or the portable terminal 303 and thereby generate a free perspective live video and distribute the free perspective live video to each image processing apparatus 200.

In addition, the configuration of a system to which the present embodiment can be applied is not limited to that illustrated. For example, an apparatus that causes an image to be displayed may be any of the head-mounted display 100, the flat panel display 302, and the portable terminal 303, and there are no limitations on combinations and numbers thereof. In addition, the head-mounted display 100 or the flat panel display 302 may incorporate the image processing apparatus 200.

It may be made possible to further connect the head-mounted display 100 or the flat panel display 302 to these apparatuses. The portable terminal 303 may be internally provided with a motion sensor for deriving the position, the orientation, and motion of the portable terminal 303, such as an acceleration sensor, a gyro sensor, or a geomagnetic sensor. In addition, it may be that the display panel in the portable terminal 303 is covered with a transparent touch-pad, detecting a touch operation by a user is made possible, or input means such as an unillustrated button is provided. An unillustrated input apparatus may be connected to the image processing apparatus 200. At this time, the server 400 may receive details of operations by each user, generate respectively corresponding images, and transmit the images to respective image processing apparatuses 200.

Figure 2:
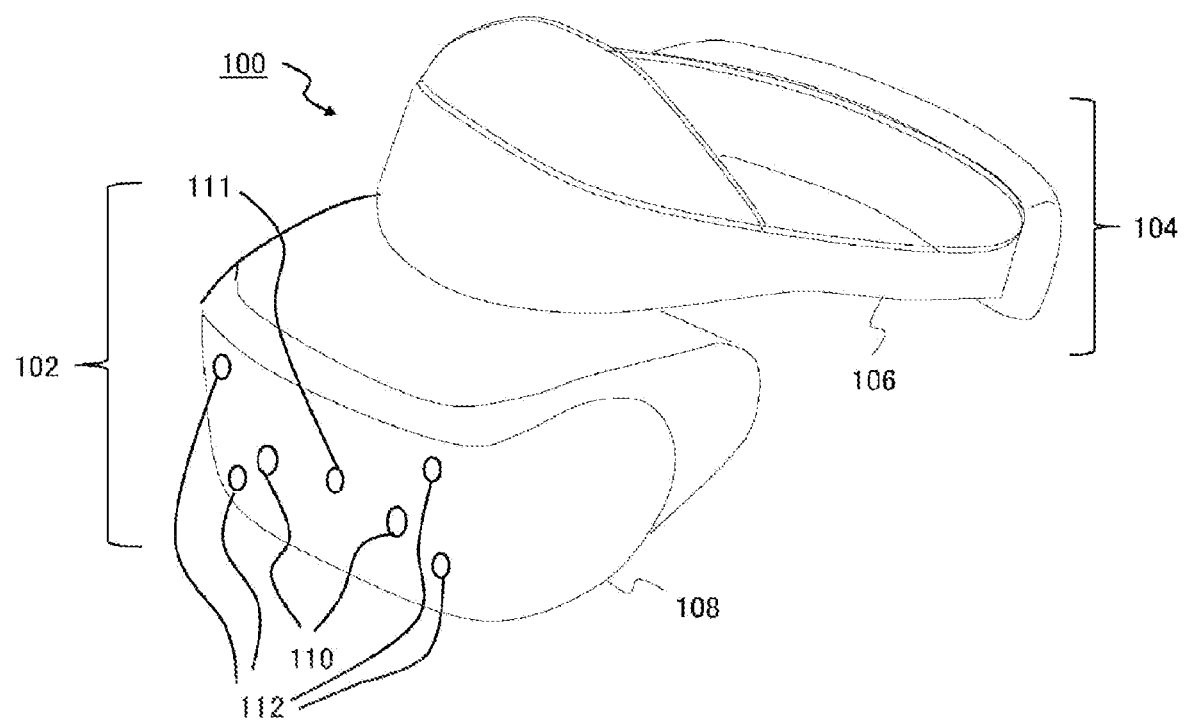
FIG. 2 is a view that illustrates an example of the appearance of a head-mounted display according to the present embodiment.

FIG. 2 illustrates an example of the appearance of the head-mounted display 100. The head-mounted display 100 in this example is configured by an output mechanism section 102 and a mounting mechanism section 104. The mounting mechanism section 104 includes a mounting band 106 that realizes securing of an apparatus around a head by being worn by a user. The output mechanism section 102 includes a housing 108 having such a shape that left and right eyes are covered in a state where a user has mounted the head-mounted display 100, and is internally provided with a display panel that faces the eyes when mounted.

Inside of the housing 108 is further provided with eyepiece lenses that are positioned between the display panel and the user's eyes when the head-mounted display 100 is mounted, and enlarge an image to be viewed. In addition, the head-mounted display 100 may further be provided with speakers or earphones at positions corresponding to the user's ears when mounted.

The head-mounted display 100 is further provided with stereo cameras 110 on the front surface of the housing 108, a monocular camera 111 with a wide viewing angle at the center, and four cameras 112 with wide viewing angles at four corners which are top-left, top-right, bottom-left, and bottom-right, and captures videos of real spaces in directions corresponding to the direction of the user's face. In one aspect, the head-mounted display 100 causes a moving image captured by the stereo cameras 110 to be immediately displayed to thereby provide a see-through mode in which the user can see the situation of the real space unchanged in the direction in which the user is facing.

In addition, at least one image captured by the stereo cameras 110, the monocular camera 111, and the four cameras 112 may be used to generate a display image. For example, it may be that SLAM (Simultaneous Localization and Mapping) is used to obtain, at a predetermined rate, the position or the orientation of the head-mounted display 100 and consequently the user's head with respect to the surrounding space, and determine a field of view for an image to generate in the server 400 and correct the image in the image processing apparatus 200. Alternatively, it may be that, in the image processing apparatus 200, a captured image is composited onto an image transmitted from the server 400 to thereby set a display image.

In addition, the head-mounted display 100 may be internally provided with any one of motion sensors for deriving the position, the orientation, and the motion of the head-mounted display 100, such as an acceleration sensor, a gyro sensor, and a geomagnetic sensor. In this case, the image processing apparatus 200 obtains, at a predetermined rate, information regarding the position or the orientation of the user's head on the basis of a measurement value from the motion sensor. This information can be used to determine a field of view for an image to generate in the server 400, or to correct the image in the image processing apparatus 200.

Figure 3:
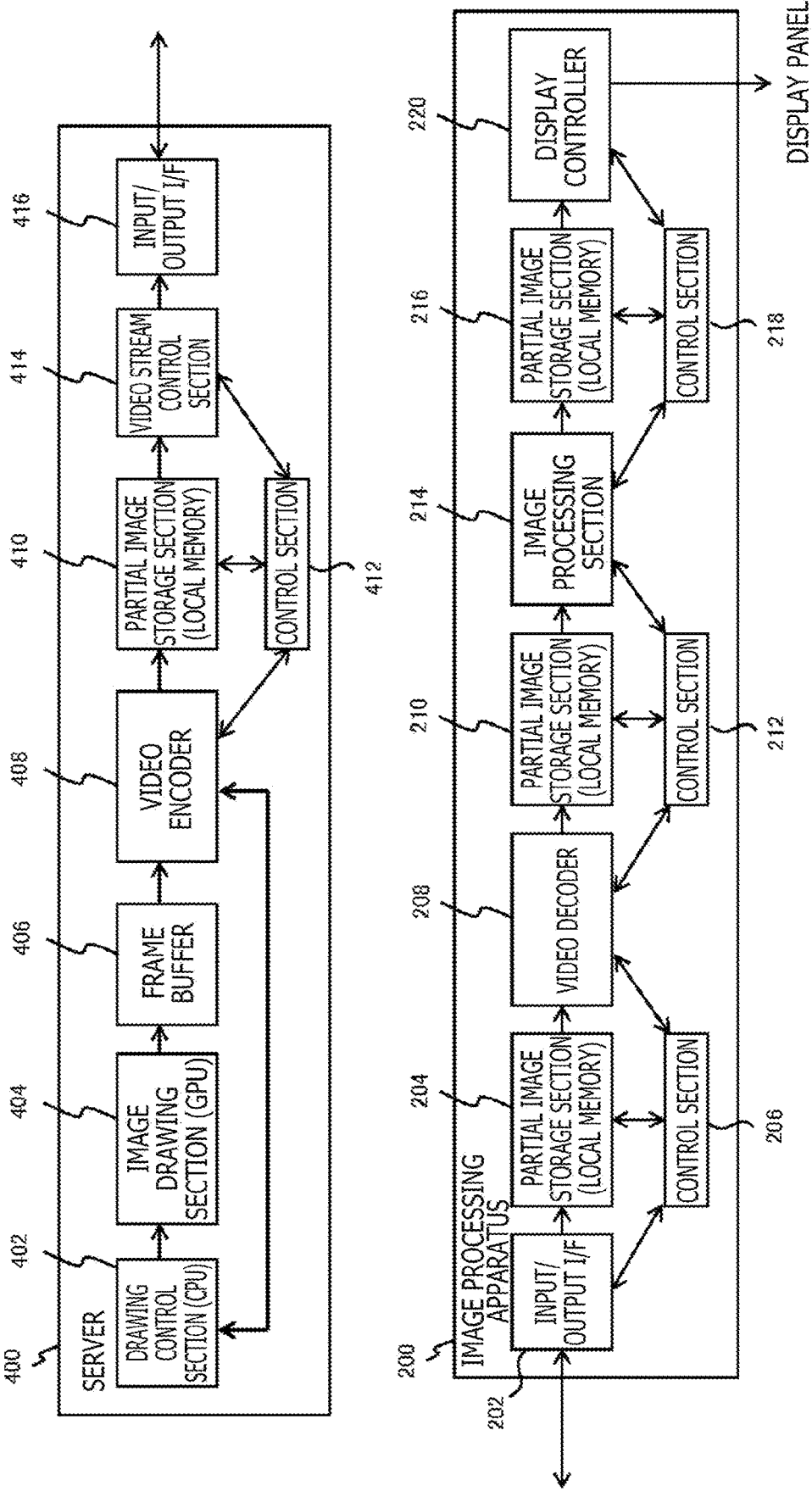
FIG. 3 is a view that illustrates basic configurations of a server and an image processing apparatus in the present embodiment.

FIG. 3 illustrates a basic configuration of the server 400 and the image processing apparatus 200 in the present embodiment. The server 400 and the image processing apparatus 200 in the present embodiment are provided with, at key locations, local memories that each store a partial image smaller than one frame of a display image. Pipeline processing in units of the partial images is performed for compression/encoding and transmission of image data in the server 400. Pipeline processing in units of the partial images is also performed in the image processing apparatus 200 for data reception, decoding/decompression, various kinds of image processing, and output to a display apparatus. As a result, the delay time from drawing of an image in the server 400 until display to a display apparatus connected to the image processing apparatus 200 is reduced.

In the server 400, a drawing control section 402 is realized by a CPU (Central Processing Unit), and controls drawing of images in an image drawing section 404. As described above, in the present embodiment, details of an image to be displayed are not particularly limited to any kind, but the drawing control section 402, for example, causes a cloud game to progress, and causes the image drawing section 404 to draw a frame of a moving image representing a result of causing the cloud game to progress. At this time, the drawing control section 402 may perform control to obtain information pertaining to the position or the orientation of the user's head from the image processing apparatus 200 and draw each frame at a corresponding field of view.

The image drawing section 404 is realized by a GPU (Graphics Processing Unit), and, under control by the drawing control section 402, draws frames for a moving image at a predetermined or variable rate, and stores a result thereof in a frame buffer 406. The frame buffer 406 is realized by a RAM (Random-Access Memory). A video encoder 408, under control by the drawing control section 402, compresses and encodes image data stored in the frame buffer 406, in units of partial images smaller than one frame. Partial images are images for respective regions obtained by dividing an image plane for a frame by a boundary line set in, for example, a horizontal direction, a vertical direction, both vertical and horizontal directions, or a diagonal direction.

At this time, as soon as an image necessary for compression and encoding of a partial image is drawn by the image drawing section 404, the video encoder 408 may start compressing and encoding the corresponding frame, without waiting for a vertical sync signal from a server. If a conventional technology that synchronizes various kinds of processing such as drawing or compression/encoding of frame images on the basis of a vertical sync signal is used, time provided for various kinds of processing from drawing until display of the images is aligned in units of frames, whereby it is easy to manage the frame order. However, in this case, even if drawing processing quickly ends due to the details of a frame, it is necessary for compression/encoding processing to wait until the next vertical sync signal. In the present embodiment, as described later, by managing this generation time in units of partial images, wasteful wait time is prevented.

An encoding scheme that the video encoder 408 uses in compression/encoding may be something typical such as H.264/AVC (Advanced Video Coding) or H.265/HEVC (High Efficiency Video Coding). The video encoder 408 stores image data which is compressed and encoded in units of partial images, in a partial image storage section 410. The partial image storage section 410 is a local memory realized by, for example, a SRAM (Static Random Access Memory), and has a storage region corresponding to the data size of a partial image that is smaller than one frame. It is similar for "partial image storage sections" described below. Each time data for a compressed and encoded partial image is stored to the partial image storage section 410, a video stream control section 414 reads out this data, and packetizes this data after, if necessary, including audio data, control information, etc., in this data.

A control section 412 constantly monitors, for example, a status of data writing by the video encoder 408 to the partial image storage section 410 and a status of data readout from the partial image storage section 410 by the video stream control section 414, and appropriately controls both operations. For example, the control section 412 performs control such that a data deficiency, in other words, a buffer underrun, or a data overflow, in other words, a buffer overrun, does not occur for the partial image storage section 410.

An input/output interface 416 establishes communication with the image processing apparatus 200, and sequentially transmits, via the network 306, data packetized by the video stream control section 414. In addition to image data, the input/output interface 416 may also transmit, as appropriate, audio data, etc. In addition, the input/output interface 416 may, if necessary, obtain, from the image processing apparatus 200, and supply, to the drawing control section 402 or the video encoder 408 for example, information pertaining to a user operation, the position or the orientation of the user's head, the granularity of image processing by the image processing apparatus 200, a scan direction in a display panel, etc.

An input/output interface 202 in the image processing apparatus 200 sequentially obtains image or audio data transmitted from the server 400. Further, the input/output interface 202 may, if necessary, obtain and transmit, to the server 400, information pertaining to a user operation, the position or the orientation of the user's head, the granularity of image processing by the image processing apparatus 200, a scan direction in a display panel, etc. After decoding a packet obtained from the server 400, the input/output interface 202 stores extracted image data in a partial image storage section 204.

The partial image storage section 204 is a local memory provided between the input/output interface 202 and a video decoder 208. A control section 206 constantly monitors, for example, a status of data writing by the input/output interface 202 to the partial image storage section 204 and a status of data readout from the partial image storage section 204 by the video decoder 208, and appropriately controls both operations. Each time data for a partial image is stored to the partial image storage section 204, the video decoder 208 reads out this data, subjects the data to decoding and decompression by a procedure that corresponds to the encoding scheme, and sequentially stores the data to a partial image storage section 210.

The partial image storage section 210 is a local memory provided between the video decoder 208 and an image processing section 214. A control section 212 constantly monitors, for example, a status of data writing by the video decoder 208 to the partial image storage section 210 and a status of data readout from the partial image storage section 210 by the image processing section 214, and appropriately controls both operations. Each time data for a decoded and decompressed partial image is stored to the partial image storage section 210, the image processing section 214 reads out this data and performs processing necessary for display. For example, in the head-mounted display 100, correction processing for supplying distortion, which is the reverse of distortion due to an eyepiece lens, is performed in order to allow an image having no distortion to be visually recognized when seen via the eyepiece lens.

Alternatively, the image processing section 214 may refer to a separately-prepared UI plane image and composite (superimpose) the UI plane image with an image transmitted from the server 400. In addition, the image processing section 214 may composite an image captured by a camera provided in the head-mounted display 100 or the portable terminal 303 with an image transmitted from the server 400. The image processing section 214 may also correct an image transmitted from the server 400 to have a field of view corresponding to the position or the orientation of the user's head at the time of processing. The image processing section 214 may also perform image processing suitable for output to the flat panel display 302, such as super-resolution processing.

In any case, the image processing section 214 performs processing in units of partial images stored in the partial image storage section 210, and sequentially stores data for partial images to a partial image storage section 216. The partial image storage section 216 is a local memory provided between the image processing section 214 and a display controller 220. A control section 218 constantly monitors, for example, a status of data writing by the image processing section 214 to the partial image storage section 216 and a status of data readout from the partial image storage section 216 by the display controller 220, and appropriately controls both operations.

Each time data for an image-processed partial image is stored to the partial image storage section 216, the display controller 220 reads out this data, and, at an appropriate timing, outputs this data to the display panel in the head-mounted display 100, the flat panel display 302, and the portable terminal 303. Specifically, data for each partial image is outputted in a predetermined order, at timings that match vertical sync signals for these displays.

Figure 4:
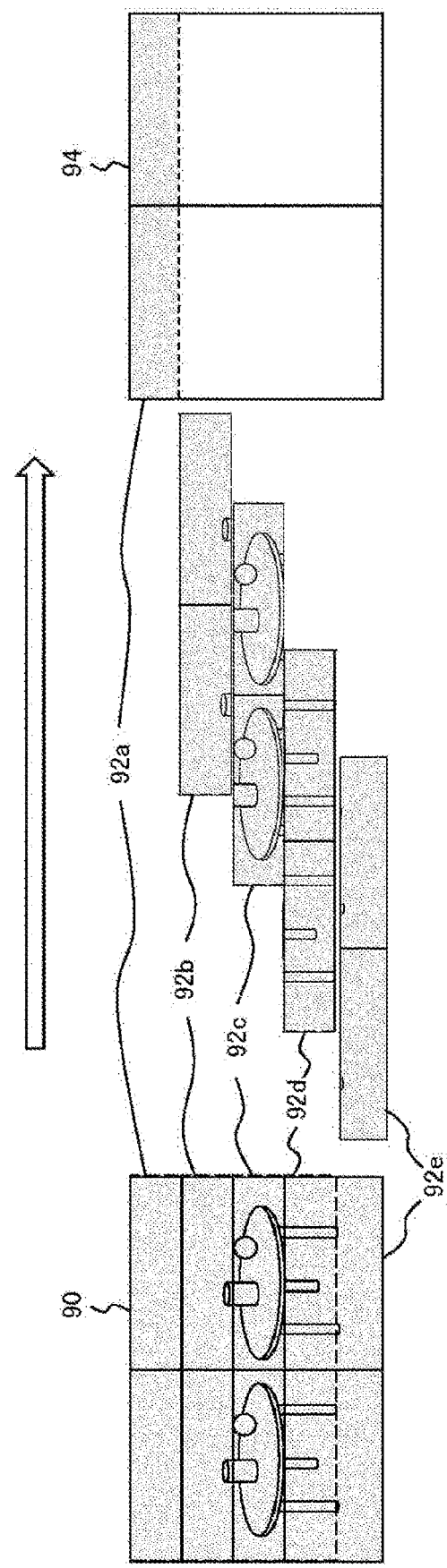
FIG. 4 is a view that conceptually illustrates a situation of processing performed from drawing of an image until display of the image in the present embodiment.

Next, description is given regarding partial image pipeline processing realized in the server 400 and the image processing apparatus 200, from drawing of an image until display of the image. FIG. 4 conceptually illustrates a situation of processing performed from drawing of an image until display of the image in the present embodiment. As described above, the server 400 generates frames 90 for a moving image at a predetermined or variable rate. In the illustrated example, a frame 90 has a configuration in which a left-eye image and a right-eye image are respectively represented by regions bisected into left and right, but this does not mean that a configuration of an image generated by the server 400 is limited to this.

As described above, in the server 400, each partial image of a frame 90 is compressed and encoded. The image plane in FIG. 4 is divided into five parts in the horizontal direction to give partial images 92a, 92b, 92c, 92d, and 92e. As a result, the partial images are successively compressed and encoded in this order, and are, as indicated by an arrow, transmitted to the image processing apparatus 200 and displayed. In other words, while such processing as compression and encoding, transmission, decoding and decompression, and output to a display panel 94 is being performed for the uppermost partial image 92a, partial images are sequentially transmitted and displayed, as with the partial image 92b under the partial image 92a and the even lower partial image 92c. As a result, it is possible to perform various kinds of necessary processing from drawing of an image to display of the image in parallel, and it is possible to cause display to progress with minimum delay even though a transfer time period is interposed.

In this manner, an effect of lowering delay due to dividing a frame into partial images and performing pipeline processing is exhibited by the manner of division (boundary lines) into partial images, the compression and encoding order, the transmission order, and the processing order in the image processing apparatus 200 corresponding to the display order (scan direction) by the display panel 94. However, there is a wide variety of devices used to display a moving image, and a display order by a display panel 94 is diversifying. For example, a method (referred to as a landscape type) of scanning a horizontally-long screen in the horizontal direction is mainstream for display apparatuses such as a home console, a personal computer, or a television receiver. An aspect illustrated in FIG. 4 is premised upon this landscape type.

In contrast, for a portable terminal such as an advanced-functionality mobile phone or a tablet, a method (referred to as a portrait type) of scanning a vertically-long screen in the horizontal direction is mainstream. In response to this, a result of the supply of portrait type display panels having become abundant is an increase of horizontally-long display apparatuses mounted with portrait type panels that have been tipped over sideways. In this case, scanning with respect to the horizontally-long screen is performed in the vertical direction. In this manner, the scan direction for a display panel can variously change due to the implementation mode of a display apparatus and occasional circumstances thereof.

Figure 5:
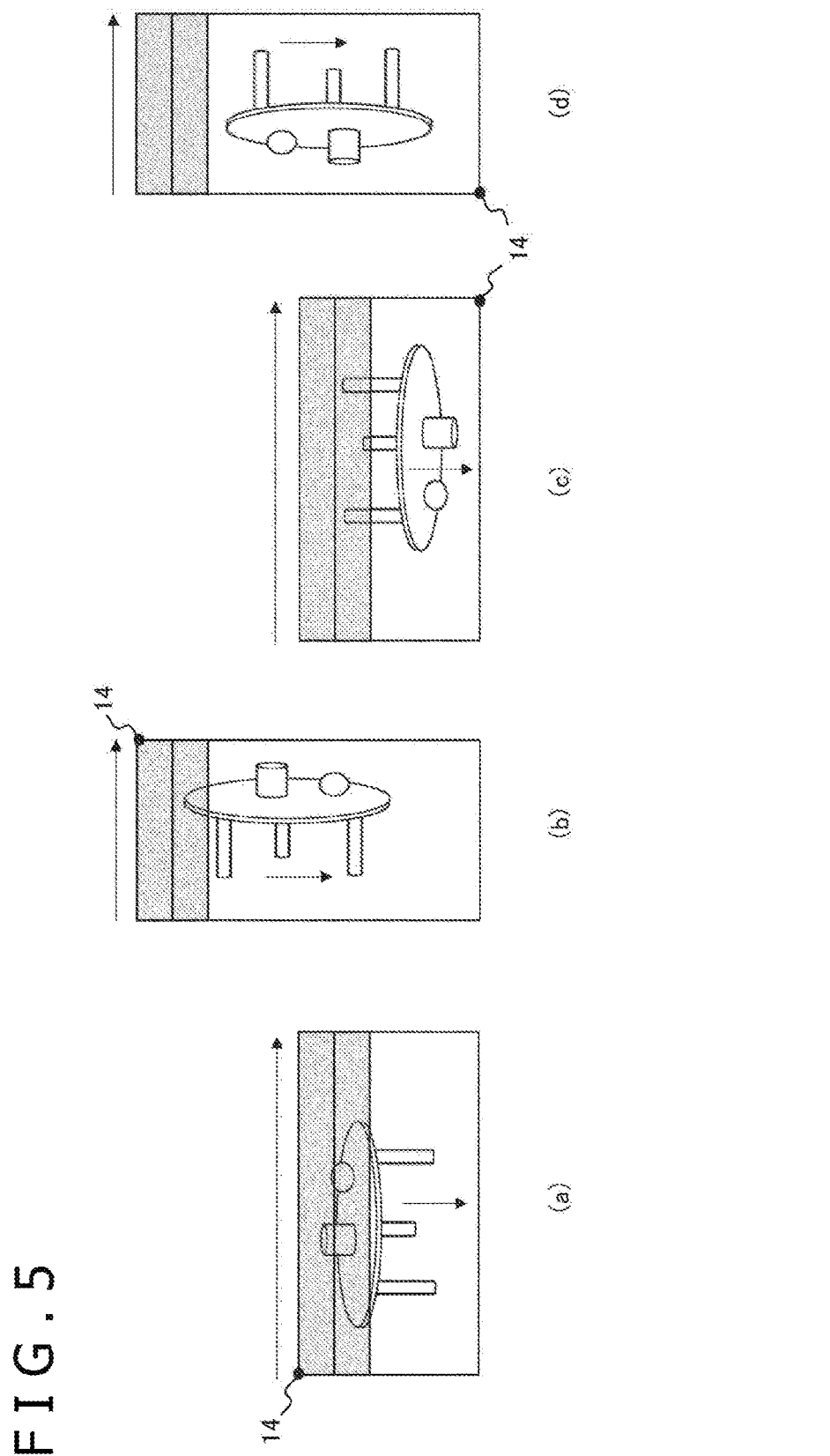
FIG. 5 depicts views that exemplify variations of scan directions for a display panel in the present embodiment.

FIG. 5 exemplifies variations of scan directions for a display panel. A rectangle in FIG. 5 represents a display screen, and a reference position 14 in the top-left of a horizontally-long image to be displayed is indicated by a black circle. In other words, the reference position 14 is a start point in a case where the image is scanned in raster order, and in general is also a start point for a time of drawing. (a) indicates a case in which an image, which is not rotated, is displayed by a landscape type display panel. Even in a case of viewing a horizontally-long image while grasping a portrait type portable terminal to be vertically long, a portion of the image enters a state as illustrated in (a). In this case, the display panel repeats, in the down direction, scanning in the right direction, with the same position as the reference position 14 as the start point.

(b) illustrates a case of displaying the image rotated clockwise by 90°, on a portrait type display panel. A state such as this occurs when a user makes a vertically-long portable terminal 303, which is of a type that enables switching of the orientation of displayed images in response to an orientation in which the vertically-long portable terminal 303 is grasped by the user, be horizontally-oriented to view a horizontally-long image. Alternatively, as described above, this occurs when a portrait type display panel is mounted to, for example, a monitor that is normally installed as horizontally long. In these cases, when scanning on the display panel is performed in the raster order, scanning in the up direction is repeated in the right direction with the bottom-left of the image as the start point.

(c) illustrates a case in which an image is displayed, with top and bottom thereof reversed, on a landscape type display panel. A state such as this, for example, occurs when a user is viewing a landscape type portable terminal upside-down. Alternatively, also in a case of viewing a portrait type portable terminal by grasping it to be vertically long and upside-down, a portion of the screen enters a state as illustrated in (c). In this case, when scanning on the display panel is performed in the raster order, scanning in the left direction is repeated in the up direction with the bottom-right of the image as the start point.

(d) illustrates a case of displaying the image rotated counterclockwise by 90°, on a portrait type display panel. A state such as this, for example, occurs when a user views a horizontally-long image after the user makes a portrait type portable terminal be horizontally-oriented in reverse to the case illustrated in (b). In this case, when scanning on the display panel is performed in the raster order, scanning in the down direction is repeated in the left direction with the top-right of the image as the start point. In this manner, the scan direction for an image changes due to structural differences in scan directions for display panel as well as an orientation in which a user grasps a portable terminal. If the user changes the orientation in which they grasp the portable terminal, the scan direction can change as needed even during reproduction of a video.

In such states as (b) to (d), even if an image drawn in the image raster order as illustrated in FIG. 4 is compressed and encoded by the server 400 in this order and transmitted to the image processing apparatus 200, there is a different order of output to the display panel, and thus an effect of lowering delay is reduced. In other words, in a case where the order of output from the image processing apparatus 200 to the display panel differs to the order of output taken as a premise by the partial image units generated by the server 400, the display controller 220 in the image processing apparatus 200 enters a state in which sequential scanning of an image in raster order is attempted in response to a partial image arriving but a necessary partial image is not present. In such a case, the image processing apparatus 200 cannot start to output until the partial image that includes a display scan start position arrives.

As is clear from FIG. 5, in a case where there are many image processing apparatuses 200, this means waiting until all partial images that configure one screen have arrived, and a low-delay nature due to partial images being sequentially transmitted and displayed is impaired. Accordingly, in the present embodiment, information pertaining to the scan order of a display panel is obtained by the server 400, and the processing order for data is adaptively switched on the basis thereof. In this case, by desirably not changing an image drawing order and switching an order in subsequent processing, such adverse effects as drawing processing being complicated and processing speed conversely decreasing are constrained.

Figure 6:
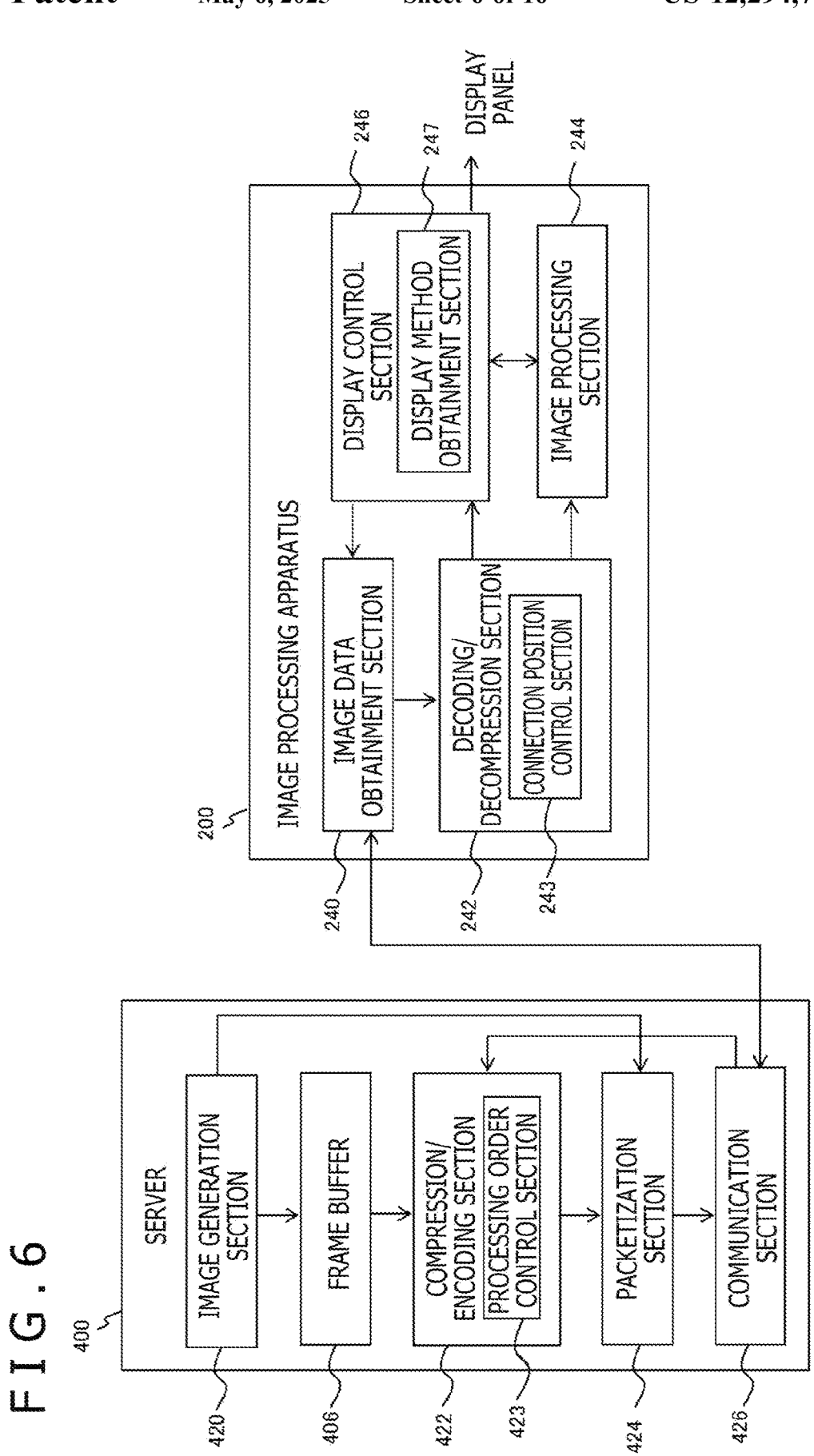
FIG. 6 is a view that illustrates functional blocks for the server and the image processing apparatus according to the present embodiment.

FIG. 6 illustrates functional blocks for the server 400 and the image processing apparatus 200 according to the present embodiment. Each functional block in FIG. 6 can be realized in terms of hardware by a CPU, a GPU, an encoder, a decoder, an arithmetic element, various types of memories, etc., and can be realized in terms of software by a program that is loaded from a recording medium to a memory and exhibits various functions such as an information processing function, an image drawing function, a data input/output function, and a communication function. Accordingly, a person skilled in the art would understand that these functional blocks can be realized in various forms by only hardware, only software, or a combination thereof, and is not limited to any of these. It is similar for functional blocks described below.

The server 400 is provided with an image generation section 420, the frame buffer 406, a compression/encoding section 422, a packetization section 424, and a communication section 426. The image generation section 420 is configured by the drawing control section 402 and the image drawing section 404 illustrated in FIG. 3, and generates, at a predetermined or variable rate, frames for a moving image to be transmitted to the image processing apparatus 200, such as game images. Alternatively, the image generation section 420 may obtain moving image data from an unillustrated camera, an unillustrated storage apparatus, etc. In this case, the image generation section 420 can be interpreted as an image obtainment section. It is similar in the following description.

As described in FIG. 3, the frame buffer 406 sequentially stores frame data for a moving image generated by the image generation section 420. The compression/encoding section 422 is configured by the video encoder 408, the partial image storage section 410, and the control section 412 illustrated in FIG. 3, reads out frame data generated by the image generation section 420 from the frame buffer 406, and performs compression and encoding in units of partial images. Here, the compression/encoding section 422 performs motion compensation or encoding that takes, as a unit, a region for a predetermined number of rows, such as one row or two rows, or a rectangular region having a predetermined size, such as 16×16 pixels or 64×64 pixels. Accordingly, the compression/encoding section 422 may start compression and encoding once data for a minimum unit region necessary for compression and encoding is generated by the image generation section 420.

Note that a partial image, which is a pipeline processing unit for compression/encoding or transmission, may be the same as this minimum unit region or may be a region larger than this. In addition, it may be that the compression/encoding section 422 incorporates a function for, according to a display pipeline, in other words, a prescribed video output timing format, reading out an image stored in a frame buffer according to a predefined pixel format and, if necessary, converting the pixel format, changing the image size, or performing image compositing, and that the compression/encoding section 422 executes this functionality before compression and encoding if necessary.

The compression/encoding section 422 is provided with a processing order control section 423 that optimizes an order of reading out pixel data from the frame buffer 406, the shape of a partial image (boundary lines in the image plane), an order of compression and encoding, etc. In other words, the processing order control section 423 controls the compression/encoding section 422 such that frame data is read out from the frame buffer 406 and compressed and encoded in an order based on the information pertaining to the scan order of a display panel that the image processing apparatus 200, which is a data transmission destination, causes to display an image.

Here, the processing order control section 423 uses a handshake with the image processing apparatus 200 to obtain the scan direction or the scan start position of the display panel, and selects a combination of the data readout order for each pixel from the frame buffer 406, the shape of partial images, and the compression and encoding order in order to have the lowest delay. For example, the processing order control section 423 may hold, in a memory, for example, a table that associates information pertaining to the scan order for the display panel with optimal conditions for the shape of partial images or the processing order, and refer to the table to determine the latter. In addition, the processing order control section 423 obtains parameters for various kinds of processing that can be handled by the image processing apparatus 200 as well as the image generation section 420 and the compression/encoding section 422 in the server 400, and selects, from among parameters that can be realized in common, a combination for which the delay is the smallest and the processing efficiency is high.

Note that the server 400 also supports a display apparatus of a type in which a plurality of display panels (partial panels) are connected to each other to configure one display panel. Here, the plurality of partial panels may be integrally formed as one physical panel. In a case where a display panel configured by partial panels is a display destination, the processing order control section 423 also obtains such information as the number of partial panels and whether or not these are scanned in parallel, and on the basis thereof, switches the data readout order, the shape of the partial images, the compression and encoding order, etc. In addition, as described above, in a case where a terminal of a type in which the display direction of an image changes due to the orientation of a display panel is set as a transmission destination, the processing order control section 423 obtains information pertaining to the orientation of the display panel as needed, and, in response to change thereof, causes the data readout order, the shape of partial images, the compression and encoding order, etc., to change.

In these situations, the processing order control section 423 may optimize the readout order of pixel data from the frame buffer 406, in consideration of a processing order for pixel data inside the image processing apparatus 200. For example, in a case where something that processes a pixel sequence in a predetermined order is included in processing performed in the image processing apparatus 200, the processing order control section 423 performs control such that the readout order from the frame buffer 406 follows the processing order in the image processing apparatus 200. As a result, the server 400 can preferentially transmit data for pixels that should be processed earlier by the image processing apparatus 200.

In contrast, in a case where processing performed in the image processing apparatus 200 is limited to processing for each predetermined region such as a partial image unit, the transmission order for pixel data in this region is less likely to impact the delay time taken until display. Accordingly, the processing order control section 423 determines the writing order for pixel data on the basis of the speed or efficiency of access to the frame buffer 406, the pixel data readout order used by the image generation section 420, etc. As a result, it is possible to minimize a sending delay on the server 400 side.

Note that information that the server 400 obtains using a handshake with the image processing apparatus 200 or an aspect of processing determined by the processing order control section 423 on the basis thereof is not limited to that described above. For example, the server 400 may use a handshake to share, with the image processing apparatus 200, at least any one item of information, such as a display resolution, a frame rate, whether or not the frame rate is variable, a pixel data format, a compression/encoding method, a buffer capacity, a transfer bandwidth, and the number of pixels read out at one time from consecutive addresses.

At this time, on the basis of the obtained information, the processing order control section 423 makes a selection of at least any one of, in addition to the above-described pixel data readout order, partial image shape, in other words, division boundaries for a frame, and compression and encoding order, the number of partial images that a display apparatus should buffer, an error correction strength and correction method for a time of compression/decompression, etc., the selection being made such that delay time, image quality, and transfer robustness become optimal. The processing order control section 423 may determine all of these parameters, or may determine only some and set other parameters as fixed.

In addition, the processing order control section 423 may notify each functional block inside the server 400 of the determined parameters, if necessary. For example, the processing order control section 423 may notify the packetization section 424 of determined parameters to thereby have the determined parameters be transmitted to the image processing apparatus 200. In addition, the handshake between the server 400 and the image processing apparatus 200 or switching of a processing mode that corresponds thereto may be performed, as appropriate, as initial processing for a stream transfer or while a moving image is being displayed on the image processing apparatus 200 side. In other words, the processing order control section 423 obtains changes of the various parameters described above from the image processing apparatus 200 as needed, and, according thereto, controls the compression/encoding section 422 to appropriately switch processing.

The packetization section 424 is configured by the video stream control section 414 and the control section 412 illustrated in FIG. 3, and packetizes, in a format that corresponds to a communication protocol used, compressed and encoded partial image data. At this time, the packetization section 424 obtains such information as the order of pixel data or the shape and size of the partial image, which has been determined by the processing order control section 423, and associates this information with the partial image data. Further, the packetization section 424 obtains the time at which the partial image has been drawn (hereinafter, referred to as a "generation time") from the image generation section 420 or the compression/encoding section 422, and associates this time with the partial image data.

The communication section 426 is configured by the input/output interface 416 illustrated in FIG. 3, and transmits a packet, which includes compressed and encoded partial image data and various items of information accompanying this, to the image processing apparatus 200. By these configurations, the server 400 uses pipeline processing in units of partial images which are smaller than one frame, to perform compression and encoding, packetization, and transmission in parallel. The communication section 426 also functions as an interface for the server 400 and the image processing apparatus 200 to use the handshake and share such information as described above. For example, the communication section 426 also functions as a display method information obtainment section that obtains information pertaining to a scan order for a display panel connected to the image processing apparatus 200.

The image processing apparatus 200 is provided with an image data obtainment section 240, a decoding/decompression section 242, an image processing section 244, and a display control section 246. Note that the decoding/decompression section 242 and the image processing section 244 have common functionality in a meaning of performing predetermined processing on partial image data to generate partial image data for display, and at least any one of these can be named generically as an "image processing section."

The image data obtainment section 240 is configured by the input/output interface 202, the partial image storage section 204, and the control section 206 illustrated in FIG. 3, and obtains compressed and encoded partial image data and the generation time thereof from the server 400.

The image data obtainment section 240 also functions as an interface for the server 400 and the image processing apparatus 200 to use the handshake and share such information as described above. The decoding/decompression section 242 is configured by the video decoder 208, the partial image storage section 210, the control section 206, and the control section 212 illustrated in FIG. 3, and decodes and decompresses compressed and encoded partial image data. Here, the decoding/decompression section 242 may start decoding/decompression processing once data for a minimum unit region necessary for compression and encoding, such as motion compensation or encoding, is obtained by the image data obtainment section 240.

Here, the decoding/decompression section 242 includes a connection position control section 243 that, on the basis of the pixel data readout order at a time of compression and encoding, the shape of partial images, the compression and encoding order, etc., in the server 400, controls the decoding/decompression section 242 such that a frame is appropriately restored. In the present embodiment, for example, even if the partial images have the same shape or size, it is possible for the arrangement of pixel data inside to change in various ways. Accordingly, on the basis of information pertaining to the arrangement of pixel data which is transmitted from the server 400, the connection position control section 243 performs control such that pixels in a decoded and decompressed partial image are returned to their original arrangement.

Further, in the present embodiment, because the size or shape of a partial image in an image plane or the generation order for compressed and encoded data can change, the connection position control section 243, on the basis of these items of information transmitted from the server 400, specifies in advance which region in a frame a decoded and decompressed partial image corresponds to. Specified information is provided to the display control section 246, whereby each partial image is made to be displayed at a correct position.

In the server 400 as described above, in a case where a display apparatus adaptively determines the number of partial images to buffer, an error correction strength and a correction method for a time of compression/decompression, etc., the connection position control section 243 also refers to these items of information transmitted from the server 400, and performs control such that appropriate correction is performed at the decoding/decompression section 242, or notifies the display control section 246 of the number of buffering.

The image processing section 244 is configured by the image processing section 214, the partial image storage section 216, the control section 212, and the control section 218 illustrated in FIG. 3, and, if necessary, performs predetermined processing on partial image data to thereby generate partial image data for display. For example, as described above, the image processing section 244 performs correction for supplying reverse distortion in consideration of distortion due to an eyepiece lens that the head-mounted display 100 is provided with.

Alternatively, the image processing section 244, in units of partial images, composites an image to be caused to displayed together with a moving image, such as a UI plane image. In addition, at this time, the image processing section 244 obtains the position or the orientation of the user's head, and corrects an image generated by the server 400 such that the field of view at a time of display is correct. As a result, it is possible to have minimum temporal deviation occur in a duration between motion by a user's head and a display image, due to an amount of time for transfer from the server 400.

The image processing section 244 may also perform one instance or combination of image processing that is typically performed. For example, the image processing section 244 may perform gamma curve correction, tone curve correction, contrast enhancement, etc. In other words, on the basis of characteristics of a display apparatus or a user designation, a necessary offset correction may be performed for pixel values and luminance values in decoded and decompressed image data. In addition, the image processing section 244 may perform noise removal processing in which neighboring pixels are referenced to perform such processing as superposition, a weighted average, or smoothing.

In addition, the image processing section 244 may align the resolution of image data with the resolution of a display panel, or refer to neighboring pixels to perform a bilinear, trilinear, etc., weighted average, oversampling, etc. In addition, the image processing section 244 may, referring to neighboring pixels, determine an image texture type, and selectively perform processing for denoising, edge enhancement, smoothing, or a tone/gamma/contrast correction that corresponds to the determined image texture type. At this time, the image processing section 244 may perform processing in alignment with an image size upscaler/downscaler.

In addition, the image processing section 244 may perform a format conversion in a case where a pixel format for image data differs for a pixel format for the display panel. For example, a conversion from YUV to RGB, a conversion from RGB to YUV, a conversion from a conversion between 444, 422, and 420 in YUV, a conversion between 8-, 10- and 12-bit color in RGB, etc., may be performed. In addition, in a case where decoded image data is of a format that supports an HDR (High Dynamic Range) luminance range but the range in a display corresponding to the HDR image luminance range is narrow (for example, the luminance dynamic range that can be displayed is narrower than an HDR format stipulation), the image processing section 244 may perform pseudo-HDR processing (a color space change) to convert to an HDR luminance range format in a range that can be supported by the display panel, while keeping HDR image features as much as possible.

In addition, in a case where decoded image data is in a format that corresponds to HDR but the display supports only SDR (Standard Dynamic Range), the image processing section 244 may perform a color space conversion to an SDR format while keeping HDR image features as much as possible. In the case where decoded image data is in a format that corresponds to SDR but the display supports HDR, the image processing section 244 may perform an HDR format enhancement conversion in alignment with characteristics of an HDR panel as much as possible.

In addition, if the gradation expression ability of the display is low, the image processing section 244 may perform an error diffusion addition, or may perform dithering processing in which processing is performed together with a pixel format conversion. In addition, in a case where there is a partial absence or an abnormality in decoded image data due to an omission in network transfer data or a garbled bit, the image processing section 244 may perform correction processing for the corresponding region. In addition, the image processing section 244 may perform a monochrome fill, a correction according to neighboring pixel duplication, a correction using a neighboring pixel in the previous frame, or a correction using a pixel inferred from the periphery in a past frame or the current frame according to adaptive absence correction.

In addition, the image processing section 244 may perform image compression in order to reduce required bandwidth for an interface to output from the image processing apparatus 200 to a display apparatus. At this time, the image processing section 244 may perform lightweight entropy encoding according to a reference to neighboring pixels, index value reference encoding, Huffman coding, etc. In addition, in a case where a display apparatus employs a liquid crystal panel, although a conversion to high resolution is possible, the reaction speed is slow. In a case where a display apparatus employs an organic EL (Electroluminescent) panel, although the reaction speed is fast, a conversion to high resolution is difficult, and a phenomenon referred to as Black Smearing, which is where color smearing occurs in black regions and the vicinity thereof, can occur.

Accordingly, the image processing section 244 may perform a correction to solve various adverse effects due to such display panels. For example, in the case of a liquid crystal panel, the image processing section 244 inserts a black image between frames to thereby reset liquid crystals and improve the reaction speed. In addition, in the case of an organic EL panel, the image processing section 244 applies an offset to a luminance value or a gamma value in a gamma correction, whereby color smearing due to Black Smearing is less likely to stand out.

The image processing section 244 may perform, with respect to an image, super-resolution processing (Super Resolution) that performs a conversion to high definition or a restoration or reconstruction of a high-frequency component. At this time, the image processing section 244 may convert the image by using machine learning or deep learning and inputting image data to a database or network model that has been constructed in advance. Here, the image processing section 244 may address lowering delay by performing conversions in units of partial images. At this time, a partial image unit is caused to match a partial image unit determined on the basis of a display panel scan order or a division configuration, whereby it is possible to convert a series of processing to a pipeline and it is possible to realize further lowering of delay.

The display control section 246 is configured by the display controller 220 and the control section 218 illustrated in FIG. 3, and sequentially causes data for a partial image for display to be displayed by display panels in the head-mounted display 100, the flat panel display 302, and the portable terminal 303. However, in the present embodiment, because compressed and encoded data for a partial image is individually obtained from the server 400, it is possible that an obtainment order gets interchanged due to a communication status or obtaining partial image data is itself not possible due to packet loss.

Accordingly, on the basis of the generation time for each item of partial image data transmitted from the server 400 and the position of each partial image on the image plane provided from the decoding/decompression section 242, the display control section 246 specifies a data obtainment status, such as the proper display order or display timing for partial image data or an amount of omitted partial image data. According to the data obtainment status, the display control section 246 causes a target for output to a display panel to change, or appropriately adjusts an output order or an output timing.

For example, according to the data obtainment status, the display control section 246 determines whether to output proper partial image data included in the next frame or to re-output data for a partial image included in a previous frame. In a case where partial images have been omitted from a frame at a ratio that is greater than or equal to a predetermined value, the display control section 246 may cause an output target to be changed according to the amount (ratio) of obtained partial images, such as by replacing the output target with data from a previous frame.

In addition, the display control section 246 may cause the output target for the next frame display time period to change, according to a result of outputting past frames or an amount of time elapsed from the generation time. The display control section 246 outputs, in a determined order and at a determined timing, data for partial images determined to be output targets, to the display panel.

The display control section 246 is provided with a display method obtainment section 247 that obtains a display method for a display panel that is a data output destination and that transmits the display method to the server 400 via the image data obtainment section 240. Here, the display method includes information pertaining to the scan order for the display panel, in other words, a scan start point or a scan direction. In addition, in a case of switching the orientation of a display image according to the orientation of a terminal, the display method obtainment section 247 also obtains, as needed, the orientation of a display panel, for example, identification information for a side positioned at the top from among the four sides. In this case, the display method obtainment section 247 includes a sensor that measures the orientation of the terminal, such as an acceleration sensor, a gyro sensor, or a geomagnetic sensor.

Further, the display method obtainment section 247 may obtain such information as a display resolution or a frame rate, whether or not the frame rate is variable, the number of partial panels that configure one display panel, the number of panels, of these partial panels, that can be scanned in parallel, or the number of panels or a scan order in a case where a plurality of the partial panels are consecutively scanned. The display method obtainment section 247 may also obtain such information as a unit region (the number of scan lines or a minimum unit for scan line length that can be allowed, whether consecutive scanning of a plurality of partial panels is allowed) that an employed compression/decompression method can support, the number of scan lines that is for a partial image and can be supported, the capacity of a buffer that holds a partial image, a pixel data format supported by a display panel, or transfer bandwidth that can be used.

As a parameter related to compression/decompression, the display method obtainment section 247 may obtain a range that the decoding/decompression section 242 can support, as well as a range that can support image compression for reducing necessary bandwidth for the interface through which the image processing section 244 outputs from the image processing apparatus 200 to a display apparatus, as described above. Note that the display resolution depends on a range that can support processing by the decoding/decompression section 242 or the display control section 246, a range that can be supported by a display panel, and a display mode such as whether an image is displayed to only a portion of the display panel. Based on this, for "the display resolution or the frame rate" and "the pixel data format supported by a display panel" described above, the display method obtainment section 247 obtains, for example, a range that can be supported by the decoding/decompression section 242 and not only a display panel.

Further, the display method obtainment section 247 may obtain, from the decoding/decompression section 242, information regarding whether or not there is a pixel arrival order or orientation that is advantageous for lowering delay when the decoding/decompression section 242 decodes and decompresses data, and regarding the arrival order and orientation in the case where there is such pixel arrival order or orientation. The "pixel arrival order or orientation that is advantageous for lowering delay" is, for example, defined on the basis of a display panel scan order/scan direction or a data reference order on a processing granularity for the decoding/decompression section 242, the image processing section 244, and the display control section 246. The server 400 is notified of at least any one of these items of information by use of the handshake. In response to this, the processing order control section 423 in the server 400 optimizes the pixel data readout order, the size or shape of partial images, the compression and encoding order, etc., as described above. In addition, as described below, for example, the width of a pixel sequence read out at one time from the frame buffer 406 may be optimized.

Figure 7:
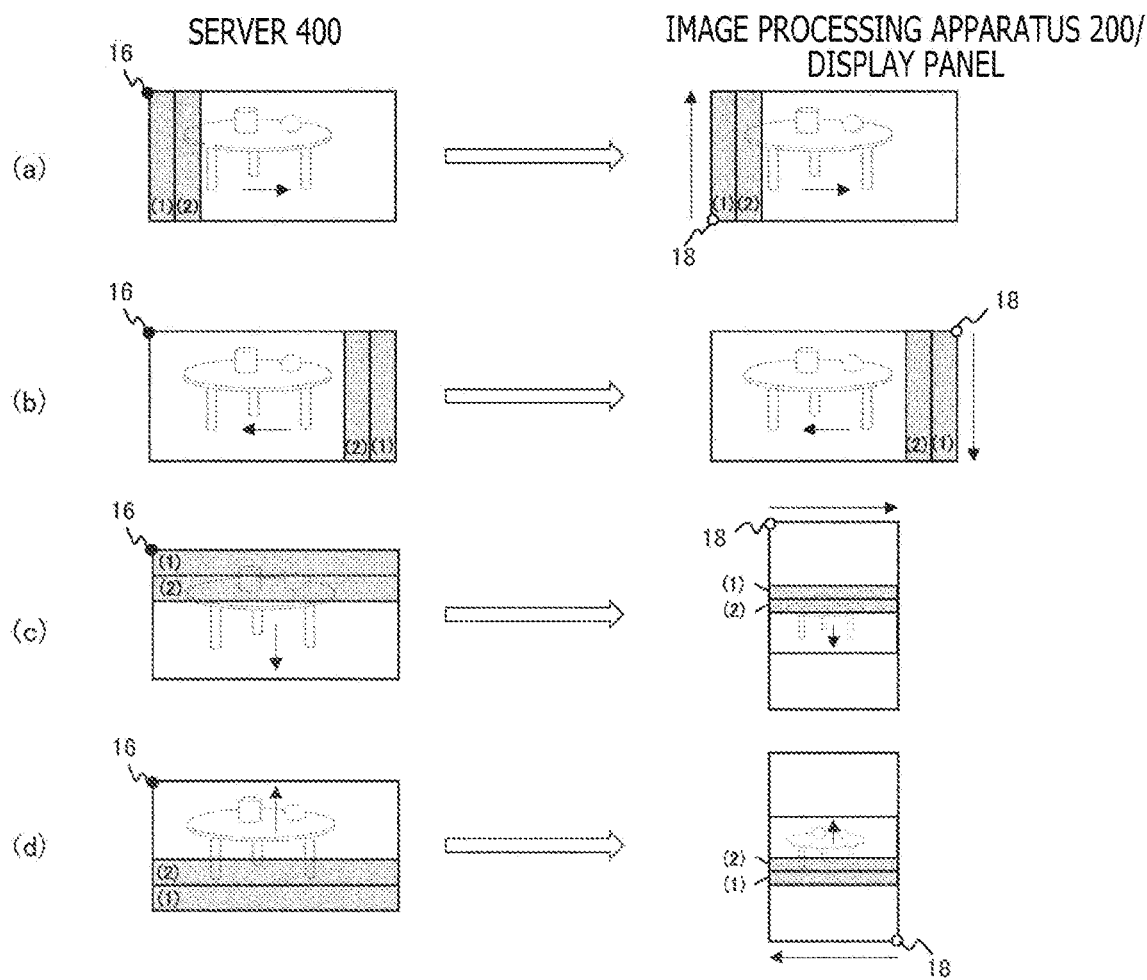
FIG. 7 depicts views that exemplify correspondence between display panel scan orders and processing orders in the server in the present embodiment.

FIG. 7 exemplifies correspondence between display panel scan orders and processing orders in the server 400. This example illustrates cases of causing a portrait type display panel to display a horizontally-long image. Rectangles in FIG. 7 represent display images, with the left side indicating the processing order by the server 400 and the right side indicating the processing order by the image processing apparatus 200 or the display order by the display panel. FIG. 7 indicates some partial images to be formed, by gray rectangular regions, and the processing order thereof is indicated by numbers. Remaining regions in each image are similarly sequentially processed in units of partial images. In addition, the start point of scanning at a time of image drawing in the server 400, in other words, in the raster order for the image, is indicated by a black circle as drawing start point 16, and the start point of scanning by the display panel is indicated by a white circle as display start point 18.

(a) indicates an aspect in which, in the server 400, a frame is divided in the vertical direction and partial images are generated in the right direction from the left end. In this manner, the scan order, in the display panel, in which scanning in the up direction from the bottom-left is repeated in the right direction, matches the processing order for partial images. (b) indicates an aspect in which, in the server 400, a frame is divided in the vertical direction and partial images are generated in the left direction from the right end. In this case, the scan order, in the display panel, in which scanning in the down direction from the top-right is repeated in the left direction, matches the processing order for partial images.

(c) indicates an aspect in which, in the server 400, an image is divided in the horizontal direction and partial images are generated in the down direction from the upper end. In this case, the scan order, in the display panel, in which scanning in the right direction from the top-left is repeated in the down direction, matches the processing order for partial images. (d) indicates an aspect in which, in the server 400, an image is divided in the horizontal direction and partial images are generated in the up direction from the lower end. In this case, the scan order, in the display panel, in which scanning in the left direction from the bottom-right is repeated in the up direction, matches the processing order for partial images. In any case, a series of processing from compression and encoding, through processing inside the image processing apparatus 200, until display can be made to progress in the same order, and processing up until display can be performed with low delay.

Figure 8:
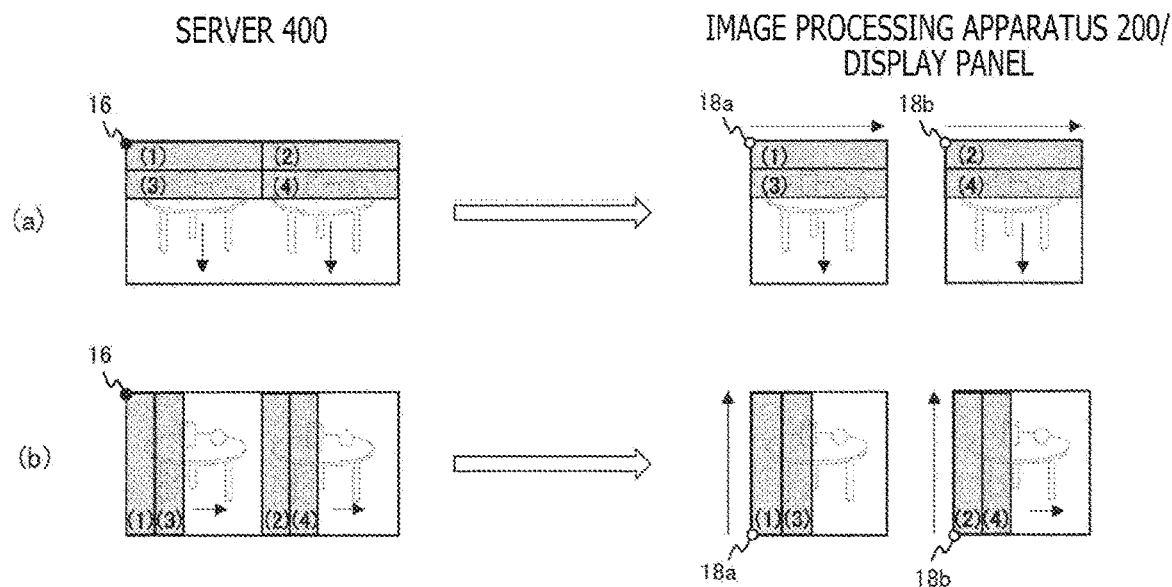
FIG. 8 depicts views that illustrate other examples of correspondence between the display panel scan orders and the processing order in the server in the present embodiment.

FIG. 8 illustrates other examples of correspondence between the display panel scan orders and the processing order in the server 400. This example illustrates a case where an image for a left eye and an image for a right eye are caused to be displayed by the left and right display panels in the head-mounted display 100. In FIG. 8, the server 400 generates, for each frame, an image representing an image for the left eye and an image for the right eye at regions resulting from dividing the image plane into left and right.

(a) illustrates an aspect in which, in the server 400, each of the left and right regions in the image plane is divided in the horizontal direction and partial images are generated in the down direction from the upper end in an alternating fashion for left and right images as represented by the numbers in (a). In this case, as illustrated on the right side of (a), in each of the display panels for the left eye and the right eye in the head-mounted display 100, the scan order in which a scan in the right direction from the top-left is repeated in the down direction matches the processing order for partial images. Note that scanning for the display panels for the left and right eyes may be in parallel.

Note that this processing order is similar to the image raster order, but has a feature in that the image plane is divided into left and right. In other words, the left eye partial image indicated by (1) and the right eye partial image indicated by (2) are separately compressed and encoded, whereby it is possible to speed up processing because the data for (2) does not need to wait when the data for (1) is decoded and decompressed by the image processing apparatus 200.

However, because these two partial images have high similarity, the partial image for (1) is set as a reference image and the difference therewith is set as compressed and encoded data for the partial image for (2), whereby it is possible to increase the compression rate. In this case, the image processing apparatus 200 refers to the partial image for (1) that has been decoded and decompressed earlier, and then decodes and decompresses the partial image for (2). It is similar for subsequent partial images.

(b) illustrates an aspect in which, in the server 400, each of the left and right regions in the image plane is divided in the vertical direction and partial images are generated in the right direction from the left end in an alternating fashion for left and right images as represented by the numbers in (b). In this case, as illustrated on the right side of (b), in each of the display panels for the left eye and the right eye in the head-mounted display 100, the scan order in which a scan in the up direction from the bottom-left is repeated in the left direction matches the processing order for partial images.

Note that, although illustration is omitted here, in the case where top and bottom for the display panel are inverted, it is sufficient if partial images are alternatingly generated from left and right regions in the image plane, in an order as in (b) or (d) in FIG. 7. In addition, the illustrated processing orders are not limited to left eye and right eye display panels for the head-mounted display 100, and can also be employed in a case of disposing and respectively driving left and right partial panels to thereby cause each to display one image.

Figure 9:
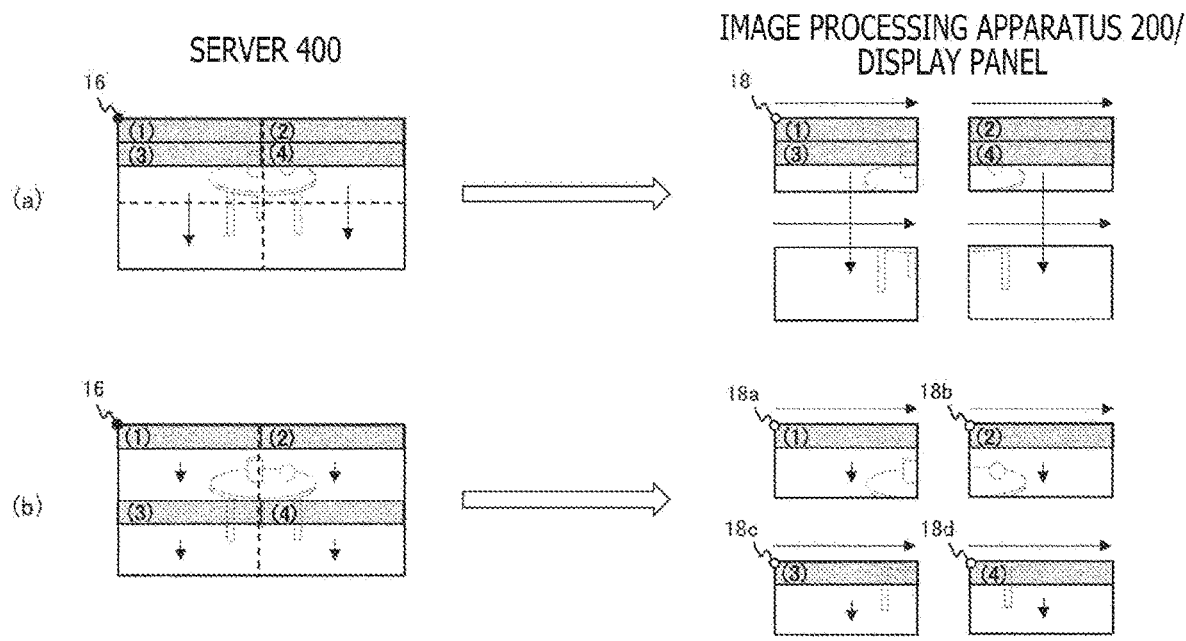
FIG. 9 depicts views that illustrate still other examples of correspondence between the display panel scan orders and the processing order in the server in the present embodiment.

FIG. 9 illustrates still other examples of correspondence between the display panel scan orders and the processing order in the server 400. This example illustrates a case in which four partial panels are disposed in two rows and two columns, four divided display images are caused to be respectively display, and one image is thus displayed. Intervals are provided for the four partial panels in FIG. 9, but actually these display one image in a state of being in contact with each other. The server 400 obtains information pertaining to boundaries for the partial panels from the image processing apparatus 200.

(a) illustrates an aspect in which, in the server 400, each of the four regions in the image plane is divided in the horizontal direction and partial images are generated in the down direction from the upper end, alternating between left and right in the two regions in the upper half as represented by the numbers in (a). This processing order is also similar to the image raster order, but has a feature in that the image plane is divided into two columns and two rows in alignment with the partial panels and partial images are formed not to straddle the boundaries thereof.

In this case, as illustrated on the right side of (a), the scan order in which scanning in the right direction from the top-left for each of the left and right partial panels in parallel is repeated in the down direction corresponds to the partial image processing order. In other words, these display panels are in common with the display panels illustrated in FIG. 8 in that the left and right partial panels are scanned in parallel and that scanning is continuous from the top to the bottom for the top and bottom partial panels.

(b) illustrates an aspect in which, in the server 400, four regions in the image plane are each divided in the horizontal direction and partial images are each generated in the down direction from an upper end while circulating among the top-left, top-right, bottom-left and bottom-right regions in this order, as represented by the numbers in (b). In this case, as illustrated on the right side of (b), the scan order in which scanning in the right direction from the top-left of the four partial panels in parallel is repeated in the down direction corresponds to the partial image processing order.

Note that, in any case, in the server 400, the minimum unit for compression and encoding is controlled such that a boundary between partial panels is not straddled, whereby it is possible to efficiently realize independent display processing for each partial panel. The aspects illustrated in FIG. 7 through 9 are examples, and because there are various scan orders for display panels or display panel configurations, it is sufficient if the server 400 adaptively determines a partial image generation order by a similar principle.

Figure 10:
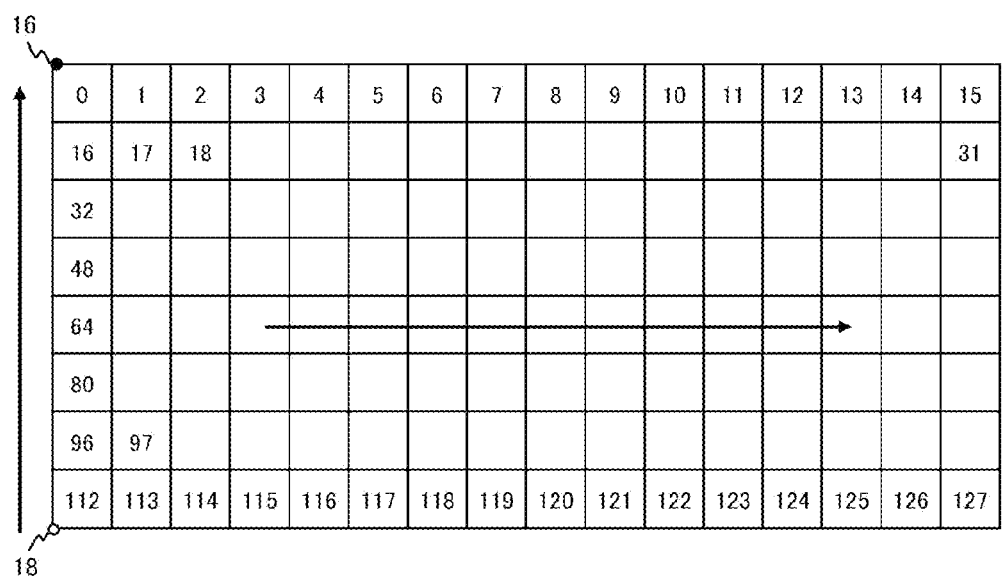
FIG. 10 is a view for describing a principle of determining a pixel data readout order in the server on the basis of a handshake with the image processing apparatus in the present embodiment.

FIG. 10 is a view for describing a principle of determining a pixel data readout order in the server 400 on the basis of a handshake with the image processing apparatus 200. FIG. 10 schematically represents an image plane, and rectangles of a minimum unit divided into a grid are set as respective pixels. In the server 400, pixel data is generated in raster order from the pixel located at the drawing start point 16. Accordingly, data is stored to the frame buffer 406 in the order indicated by the numbers in respective pixel regions.

In contrast, in a display panel, as indicated by an arrow, scanning in the up direction is repeated in the right direction with the bottom-left in the image as the display start point 18. In other words, in the display panel, the image is displayed in the order of pixel numbers 112, 96, 80, . . . , 0, 113, 97, . . . . With such a premise, the processing order control section 423 in the server 400, for example, adaptively switches the order of reading out pixel data from the frame buffer 406, according to the granularity of processing by the image processing apparatus 200.

For example, in a case of processing pixel data in the image processing apparatus 200 at a granularity smaller than a partial image such as units of pixels, the pixel data readout order follows the order with these units, to give an order of pixel numbers 112, 96, 80, . . . 0, 113, 97, . . . , for example. By reading out pixel data and forming a pixel sequence in the partial image in this order, the image processing apparatus 200 can start processing from data obtained earlier and can perform display in this order, and thus the delay time until display is reduced.

However, in a case of processing data consolidated in units of partial images in the image processing apparatus 200, arrangement of pixels in a partial image is less likely to impact the amount of time taken until display. Accordingly, for example, there is also a case where it is possible to shorten the amount of time taken from drawing to transmission by reading out pixel data from a partial image in an order in which storage to the frame buffer 406 is performed, in other words, an order such as 0, 16, 32, . . . .

Figure 11:
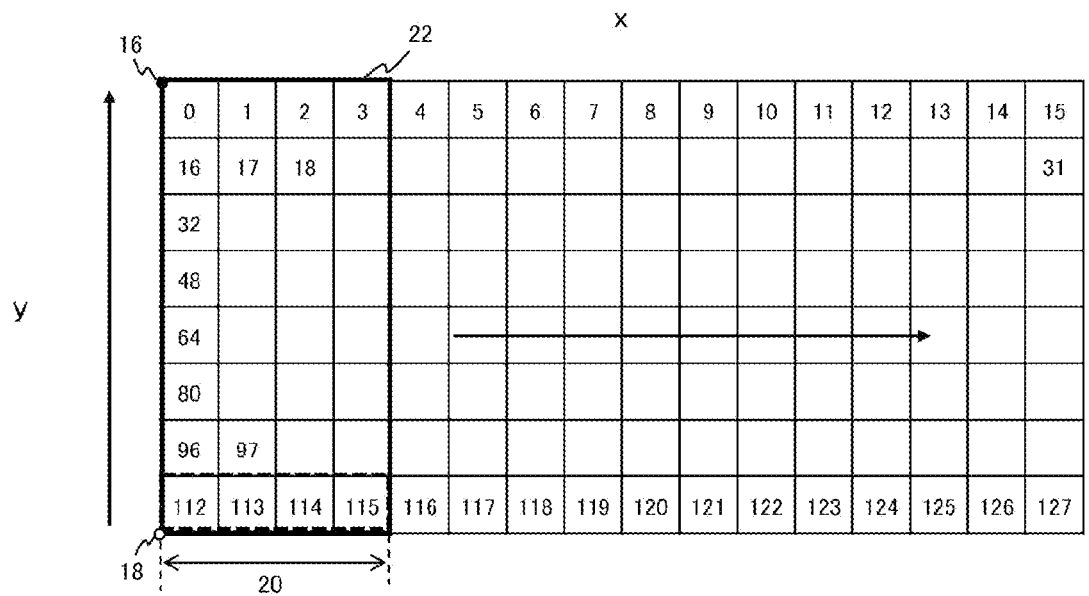
FIG. 11 is a view for describing a different principle of determining a pixel data readout order in the server on the basis of a handshake with the image processing apparatus in the present embodiment.

FIG. 11 is a view for describing a different principle of determining a pixel data readout order in the server 400 on the basis of a handshake with the image processing apparatus 200. How representation is performed in FIG. 11, the image data generation order, and the display panel scan order are similar to the case illustrated in FIG. 10. A basic policy for determining a pixel readout order is similar to the case illustrated in FIG. 10, but this example further illustrates a case in which consideration has been given to the efficiency of accessing a storage region in the frame buffer 406.

The image generation section 420 in the server 400 generates pixel data in the order indicated by pixel numbers, and stores the pixel data to the frame buffer 406. In other words, a storage region (memory address) is allocated in the raster order for the image. In contrast, in the case where the readout order is set to be in the vertical direction from the display start point 18 located in the bottom-left, when pixel data is read out one-by-one as with the pixel numbers 112, 96, 80, . . . , access to nonconsecutive addresses will be necessary for each pixel, which has low data granularity, and the readout processing efficiency is bad.

Accordingly, a plurality of items of pixel data are collectively read out from consecutive addresses to a certain degree, whereby the readout speed is improved. The illustrated example illustrates an aspect in which a readout in units of four pixels as with pixels at the consecutive numbers 112 to 115, for example, is scanned in the up direction from the display start point 18 side and this is repeated in the right direction. In other words, the compression/encoding section 422 sets four consecutive pixels that are orthogonal to the scan direction as a readout unit, and reads out pixel data in a direction corresponding to the display panel scan direction at that width.

Here, the number of pixels (a readout width 20) to be set to the readout unit is determined on the basis of the balance between speeding up by reading out data in this manner and the wait time until the corresponding pixel data is written. In addition, an optimal readout width 20 also depends on the configuration of a system for accessing a frame buffer. When the compression/encoding section 422 accesses the frame buffer 406, a data access interface held by the compression/encoding section 422, via an on-chip interconnect, accesses a memory that holds the frame buffer 406. In this series of systems, when accessing a plurality of pixels in consecutive addresses, there is an access data length (in other words, a burst length) having the best efficiency.

For example, in a case where this system is constructed with a 128-bit width and a single pixel is four bytes (=32 bits), transfer in units of four pixels (=32 bits×4=128 bits) can be collectively executed once. Here, if, hypothetically, access is performed in units of eight pixels (=32 bits×8=256 bits), transfer of 128 bits is repeated twice. However, the amount of time required for transfer can be shortened more than when performing a transfer in units of four pixels twice. This is because, by addresses being consecutive, it is possible to shorten the amount of time required for address notification or memory referencing. In contrast, when, hypothetically, access is performed in units of single pixels (=32 bits×1=32 bits) or units of two pixels (=32 bits×2=64 bits), 96 bits and 64 bits are respectively unused from among these systems, and the amount of time required for transfer does not change from when transfer is performed with a 128-bit width. Accordingly, in systems such as these, efficient readout is achieved by setting the readout width 20 to the bus width of the system or a natural number multiple of a memory access width.

In addition, a direction in which readout of pixel data for the readout width 20 progresses does not need to follow a scan direction in a display panel. In other words, the direction of progress of a readout may be determined to be a best direction for processing efficiency and lowering delay, in the light of a data storage order by the image generation section 420, a decoding/decompression order in the image processing apparatus 200, etc.

Because an optimal value for the readout width 20 or an optimal readout progress direction can change due to the scan order in a display panel, the correspondence between various items of information obtained through the handshake and optimal values therefor is obtained in advance, and selected as appropriate by the processing order control section 423. The number of pixels for the readout width 20 which are selected in this manner may be the same as or may be different to the width of a partial image which is a unit of compression and encoding.

However, by setting the readout width 20 to 1/N (N is a natural number) of the width of a partial image, it is possible to include pixel data read out in one memory access in the same compressed and encoded data, and there is good efficiency. In the example in FIG. 11, the readout width 20 is set to four pixels and reading proceeds in the vertical direction, whereby a vertically-long region 22 having 4×8 pixels in one column portion of the image is read out, but in this case, consideration can be given to setting the partial image to 4×8 pixels, 8×8 pixels, etc.

Figure 12:
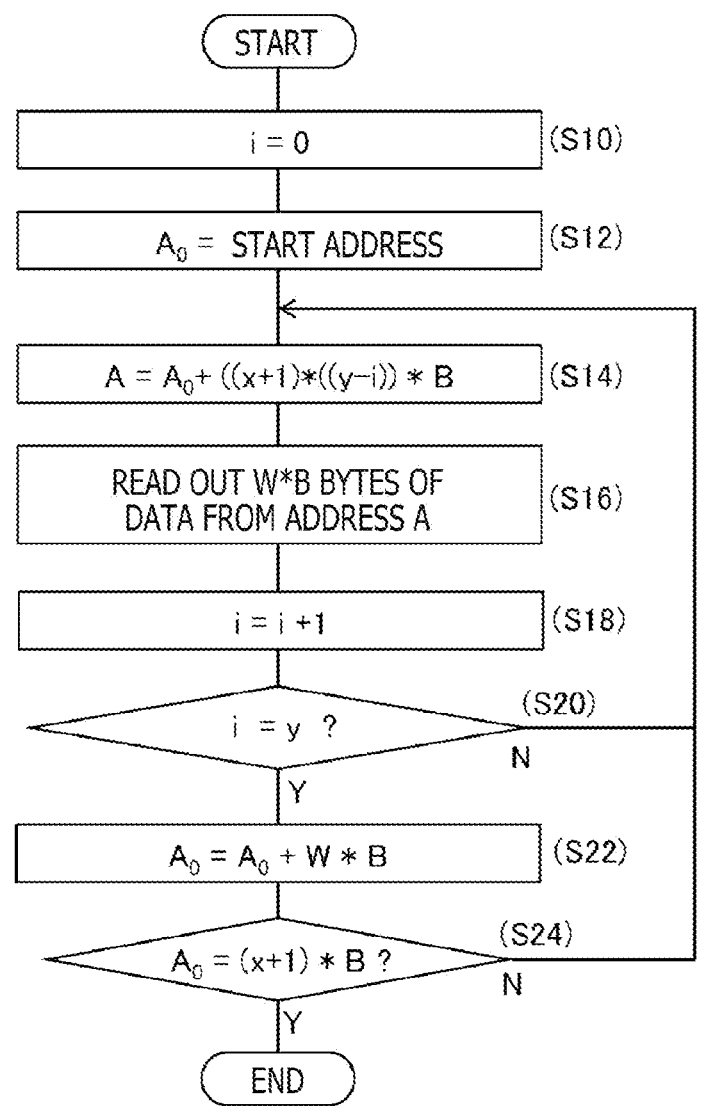
FIG. 12 is a flow chart illustrating a procedure for processing performed in a case where a compression/encoding section according to the present embodiment reads out data in a plurality of pixel units from a frame buffer.

FIG. 12 is a flow chart illustrating a procedure for processing performed in a case where the compression/encoding section 422 according to the present embodiment reads out data in a plurality of pixel units from the frame buffer 406. Firstly, a parameter i is initialized to 0 (S10), and a start address in the frame buffer 406 is assigned to a parameter $A_0$ (S12). Next, (x+1)*(y−i)*B is added to the parameter $A_0$ to thereby calculate an address A to be read out from (S14). Here, (x, y) is (the number of pixels in the horizontal direction minus 1, the number of pixels in the vertical direction minus 1) for a frame, and x=15 and y=7 in the example in FIG. 11. In addition, B (bytes) is the data size of one pixel.

In the example in FIG. 11, the address A indicates an address with the pixel number 112. The compression/encoding section 422 reads out data for W*B portions from the address A (S16). Here, W is a readout width (number of pixels), and W=4 in the example in FIG. 11. Next, the parameter i is incremented (S18), and, if the value thereof has not reached y (N in S20), processing from S14 to S18 repeats. In the example in FIG. 11, data in the region 22 is read out as a result of this processing being repeated eight times.

If a value resulting from incrementing the parameter i reaches y (Y in S20), an address resulting from adding W+B to the parameter $A_0$ is made to be a new $A_0$ (S22). This processing corresponds to shifting the region to be read out from to the left by four pixels from the region 22 in FIG. 11. If the new parameter $A_0$ has not reached (x+1)*B, in other words, the last address at the top rank in the frame (N in S24), the processing from S14 to S22 repeats. If the parameter $A_0$ has reached (x+1)*B, readout processing for the frame completes (Y in S24). In the example in FIG. 11, pixel data for the entire frame is read out as a result of S14 to S22 being repeated four times.

Note that the processing procedure illustrated in FIG. 12 is premised upon the readout order illustrated in FIG. 11, but it would be understood by a person skilled in the art that the formulas for the parameter A in S14 and the parameter $A_0$ in S22 naturally differ if the readout order is different. For example, in the case of the order illustrated by (b) in FIG. 7, the parameters A and $A_0$ are calculated by formulas by which readout in units of pixels for the readout width W from the top to the bottom of the image plane repeats in the left direction. In addition, with a readout order as with (b) in FIG. 8, the parameter $A_0$ is calculated by a formula by which the left and right regions in the image plane are alternatingly read out from.

Next, description is given regarding parameters obtained by a handshake between the server 400 and the image processing apparatus 200 and details of processing in the server 400 which is optimized thereby. FIG. 13 depicts views for describing parameters obtained by a handshake between the server 400 and the image processing apparatus 200. As indicated by (a), in a case of displaying an image after making a landscape type display panel be horizontally long, for example, the following information is transmitted from the image processing apparatus 200.

Scan start point: a
   Scan direction: a to b
   Number of partial panels: 1
   Number of partial panels to scan simultaneously or in parallel: 1
   Number of partial panels that will perform consecutive scanning: 1
   Scan order for partial panels: 1
   Side at upper end in panel: ab Here, "a," "b," "c," and "d" are, as illustrated in FIG. 13, four vertexes of a screen.

In addition, from the image processing apparatus 200, at least either the number of scan lines (width) S and the number of pixels T in the scan direction for a minimum unit region 24 that a compression/decompression method can support or the number of scan lines (width) and the number of pixels in the scan direction for a minimum unit region for which scan control is possible may be obtained. The minimum unit region for which scan control is possible depends on whether or not a display panel is configured by a plurality of partial panels, a display mode, etc. It is similar even for the following aspects.

In the illustrated examples, for example, S=2 and T=16. As indicated by (b), in a case of displaying an image after making a portrait type display panel be horizontally long, for example, the following information is transmitted from the image processing apparatus 200.

Scan start point: c
   Scan direction: c to a
   Number of partial panels: 1
   Number of partial panels to scan simultaneously or in parallel: 1
   Number of partial panels that will perform consecutive scanning: 1
   Scan order for partial panels: 1
   Side at upper end in panel: ab In a case where the portrait type display panel in (b) is made to be vertically orientated as illustrated by (c), for example, the following information is transmitted from the image processing apparatus 200.

Figure 14:
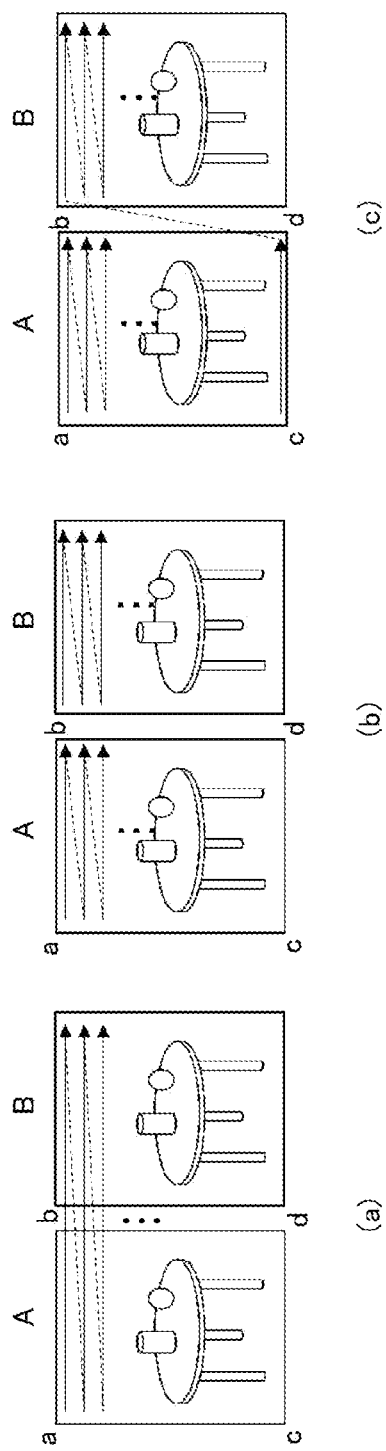
FIG. 14 depicts views for describing other examples of parameters obtained by a handshake between the server and the image processing apparatus in the present embodiment.

Scan start point: c
   Scan direction: c to a
   Number of partial panels: 1
   Number of partial panels to scan simultaneously or in parallel: 1
   Number of partial panels that will perform consecutive scanning: 1
   Scan order for partial panels: 1
   Side at upper end in panel: bd FIG. 14 depicts views for describing other examples of parameters obtained by a handshake between the server 400 and the image processing apparatus 200. FIG. 14 envisions the left and right display panels in the head-mounted display 100. As illustrated in (a), in a case of a display panel for which two partial panels are consecutively scanned as with one panel, for example, the following information is transmitted from the image processing apparatus 200.

Scan start point: a
   Scan direction: a to b
   Number of partial panels: 2
   Number of partial panels to scan simultaneously or in parallel: 2
   Number of partial panels that will perform consecutive scanning: 2 (number of pixels in scan direction for minimum unit region for which scan control is possible: from left end of 1 to right end of 2)
   Scan order for partial panels: A to B
   Side at upper end in panel: ab Here, "A" and "B" are identification numbers for the left and right partial panels, as illustrated in FIG. 14. As illustrated in (b), in a case of a display panel for which two partial panels are scanned in parallel, for example, the following information is transmitted from the image processing apparatus 200.

Scan start point: a
   Scan direction: a to b
   Number of partial panels: 2
   Number of partial panels to scan simultaneously or in parallel: 2
   Number of partial panels that will perform consecutive scanning: 1 (number of pixels in scan direction for minimum unit region for which scan control is possible: from left end to right end of 1 and from left end to right end of 2)
   Scan order for partial panels: A to B in parallel
   Side at upper end in panel: ab As illustrated in (c), in a case of a display panel for which two partial panels are individually scanned in order, for example, the following information is transmitted from the image processing apparatus 200.

Scan start point: a
   Scan direction: a to b
   Number of partial panels: 2
   Number of partial panels to scan simultaneously or in parallel: 1
   Number of partial panels that will perform consecutive scanning: 1 (number of pixels in scan direction for minimum unit region for which scan control is possible: from left end to right end of 1 and from left end to right end of 2)

Scan order for partial panels: A to B

Side at upper end in panel: ab

Note that the number of pixels in the scan direction for the minimum unit region for which scan control is possible may be set to be variable. For example, it may be that any one of 960 pixels, 1000 pixels, or 1024 pixels is selected as a mode for a display panel and that the image processing apparatus 200 learns this and transmits this to the server 400.

In addition, the server 400, for example, learns the following information which indicate ranges that can be supported on the server 400 side. Here, "width" is the number of pixels in a direction orthogonal to the scan direction, as described above.

1. Resolutions, frame rates, and pixel data formats with which drawing is possible
2. Number of pixels for a readout unit that can be supported and has good efficiency (readout width U)
3. Direction of progress for readout with good efficiency in case of reading out a plurality of pixel units
4. Unit region that can be supported in compression/decompression method (minimum width S and number of pixels T in scan direction)
5. Partial image width V that can be supported
6. Capacity of buffer memory (partial image storage section) that holds a partial image From these items of information, the processing order control section 423 in the server 400 determines details of processing in the server 400 such as the following, for example.

Partial image generation order: generate, in parallel to the scan direction, a partial image from a position that includes the scan start position in the display panel, whereby delay is lowered.

Partial image width: set to value that satisfies a natural number multiple of the partial image width V which can be processed, a natural number multiple of the readout width U, a natural number multiple of the minimum unit region width for which scan control is possible, and a natural number multiple of a minimum width S of a unit region that the compression/encoding method can support. For example, it may be that the partial image width is set to the least common multiple of these parameters, whereby lowering delay for the entire processing system is addressed by lowering granularity.

Partial image scan length: set to a scan length which is a natural number multiple of the number of pixels in the scan direction for a minimum unit region for which scan control is possible, is a natural number multiple of the number of pixels T in the scan direction for the minimum unit region that the compression/decompression method can support, and can be supported by the display panel. Here, in the case where the display panel is configured by partial panels, consideration is also given to whether or not the scan length that can be supported by the display panel handles a panel that performs consecutive scanning as integral.

In addition, as described above, in a case where the readout unit is a plurality of pixels and in the case where there is a pixel data arrival order that will be advantageous for lowering delay in decoding/decompression processing in the image processing apparatus 200, the server 400, after obtaining this information from the image processing apparatus 200, determines the readout progress direction according to this order. In a case where the direction of progress is made to be different from a pixel order advantageous for lowering delay, a target range for one round of compressing and encoding stops at the number of pixels T in the scan direction for the minimum unit region that the compression/decompression method can support. In addition, a unit for one round of compression and encoding is determined in consideration of whether or not a consecutive scan is permitted, in a range that does not exceed a partial image.

In addition, the data size of a partial image may be determined in consideration of jitter for an amount of processing time required for transfer, compression/decompression, etc. until display. Specifically, it may be that the number of partial images necessary to avoid data underflow in display may be calculated, and the data size of a partial image may be determined such that it is possible to store the above-mentioned number of items of data within the capacity of a buffer memory (partial image storage section) held by the image processing apparatus 200.

Here, the image processing apparatus 200 continuously obtains jitter, and uses a handshake to share corresponding information with the server 400, as needed. As a result, the server 400 updates the number of partial images necessary to avoid an underflow, and, as needed, redetermines the data size of a partial image on the basis thereof. In addition, based on that having a wide target range for one round of compression and encoding raises the compression efficiency and improves image quality, it may be that an improvement of image quality is addressed by increasing the size of a partial image to generate and the target range for one round of compression and encoding, within ranges where delay can be tolerated.

Further, using the above-mentioned handshake, the image generation section 420 may appropriately determine a resolution for a frame to draw and a format of pixel data. For example, the image generation section 420, from ranges that a display apparatus can support, selects these parameters such that a transfer data size, estimated from such perspectives as a frame rate or a forecast for a compression rate, fits within available transfer bandwidth. In a case where it is possible to select a plurality of formats or compression methods (compression rates), the image generation section 420 or the compression/encoding section 422 selects a combination having a higher bit depth and lower compression rate to thereby achieve the best image quality.

Figure 15:
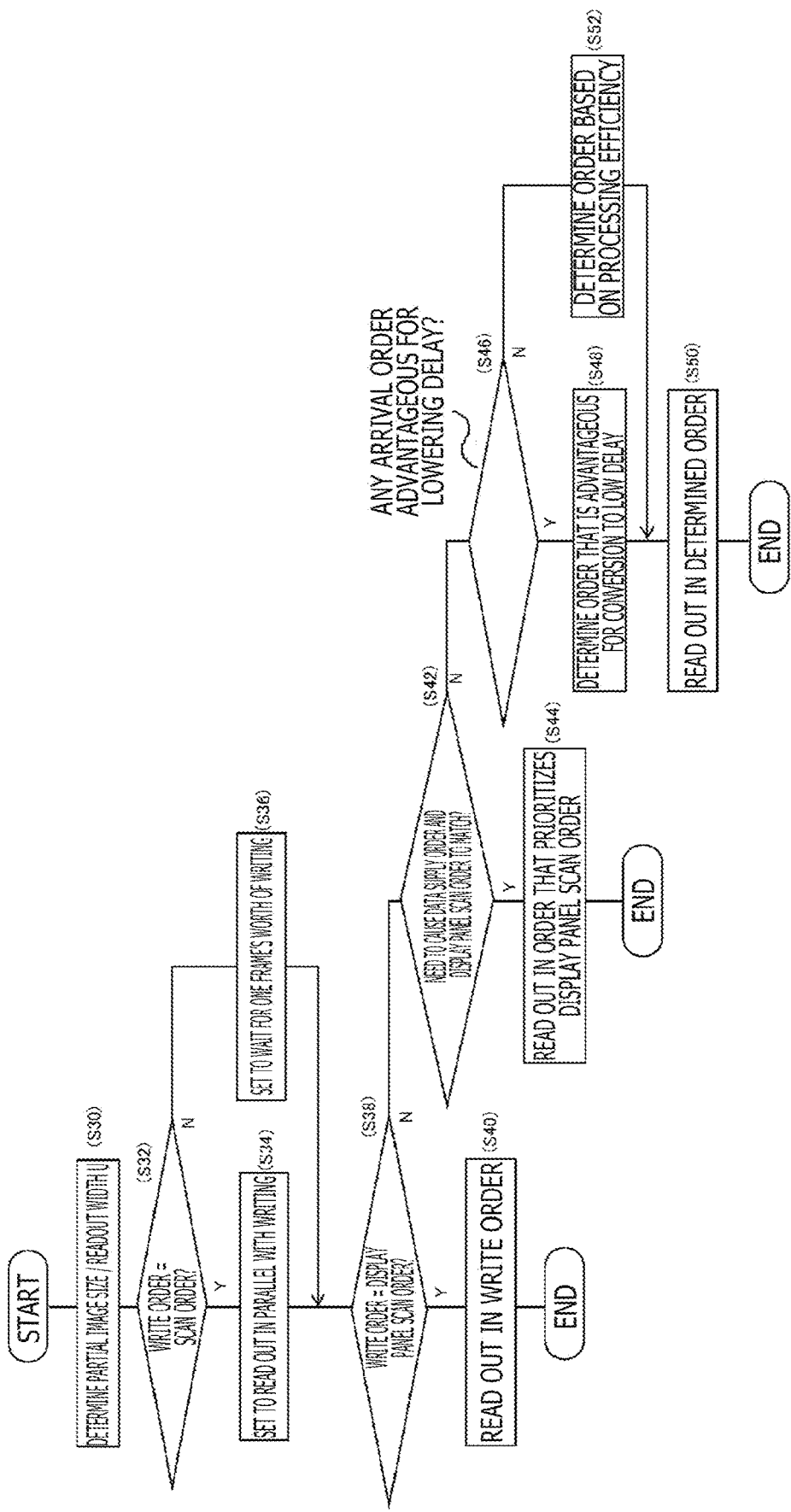
FIG. 15 is a flow chart for the compression/encoding section in the server to determine an order in which data is read out from the frame buffer in the present embodiment.

FIG. 15 is a flow chart for the compression/encoding section 422 in the server 400 to determine an order in which data is read out from the frame buffer 406. Firstly, the compression/encoding section 422 uses a handshake between the server 400 and the image processing apparatus 200 to determine a partial image size and a readout width U (S30. Next, the compression/encoding section 422 confirms whether or not the final image data writing order by the image generation section 420 with respect to the frame buffer 406 is the same as the scan order (S32).

This is because there are cases where the data writing order by the image generation section 420, in other words, the GPU, with respect to the frame buffer 406 does not match the scan order due to a drawing method. In the case where the writing order is the same as the scan order (Y in S32), the compression/encoding section 422, in parallel with the image generation section 420 writing pixel data to the frame buffer 406, makes a setting for reading out this data (S34). If the writing order is not the same as the scan order (N in S32), the compression/encoding section 422 makes a setting for starting readout after data for one frame is written to the frame buffer 406 (S34).

In either case, the compression/encoding section 422 confirms whether or not the writing order by the image generation section 420 with respect to the frame buffer 406 matches the scan order for the display panel (S38). In a case of matching (Y in S38), the compression/encoding section 422 reads out, in that order, the data written by the image generation section 420 to the frame buffer 406 (S40). In a case where readout is performed in parallel to writing by the image generation section 420, the image generation section 420 and the compression/encoding section 422 cooperate and perform control such that readout processing does not overtake writing processing.

In the case where the writing order with respect to the frame buffer 406 does not match the display panel scan order (N in S38), the compression/encoding section 422 confirms whether or not it is necessary to cause a data supply order to completely match the display panel scan order, in one partial image (S42). Whether or not it is necessary to cause matching is determined on the basis of a range that can be supported by the compression/encoding section 422 in the server 400, and the decoding/decompression section 242, the image processing section 244, and the display control section 246 in the image processing apparatus 200.

In a case where it is necessary to cause the data supply order to completely match the display panel scan order (Y in S42), the compression/encoding section 422 reads out pixel data from the frame buffer 406 in an order resulting from prioritizing the display panel scan order instead of readout efficiency (S44). If reading out in units of pixels is necessary at this time, the readout width U becomes one pixel. If it is not necessary to cause the data supply order and the display panel scan order to completely match (N in S42), the compression/encoding section 422, from the perspective of processing in the compression/encoding section 422 or the image processing apparatus 200, confirms whether or not there is a pixel data arrival order that will be advantageous for lowering delay (S46).

If there is an arrival order that is advantageous for lowering delay (Y in S46), the compression/encoding section 422 makes the data readout order in one partial image be an order that is advantageous for lowering delay (S48). At this time, the compression/encoding section 422 determines a readout order in the vertical direction and the horizontal direction for an image plane as illustrated in FIGS. 10 and 11, and also formulas for the parameters A and $A_0$ in FIG. 12. The compression/encoding section 422 then reads out pixel data from the frame buffer 406 in the determined order (S50).

If there is no pixel data arrival order that would be advantageous for lowering delay (N in S46), the compression/encoding section 422 makes the data readout order within one partial image be an order based on only processing efficiency (S52). In this case as well, the compression/encoding section 422 determines, on the basis of the determined order, a readout order in the vertical direction and the horizontal direction for an image plane, and also formulas for the parameters A and $A_0$ in FIG. 12. Note that, in this case, in the decoding/decompression section 242 in the image processing apparatus 200, the connection position control section 243, if necessary, switches the order of pixel sequences transmitted from the server 400, to thereby reconstruct the data. The compression/encoding section 422 then reads out pixel data from the frame buffer 406 in the determined order (S50).

Figure 16:
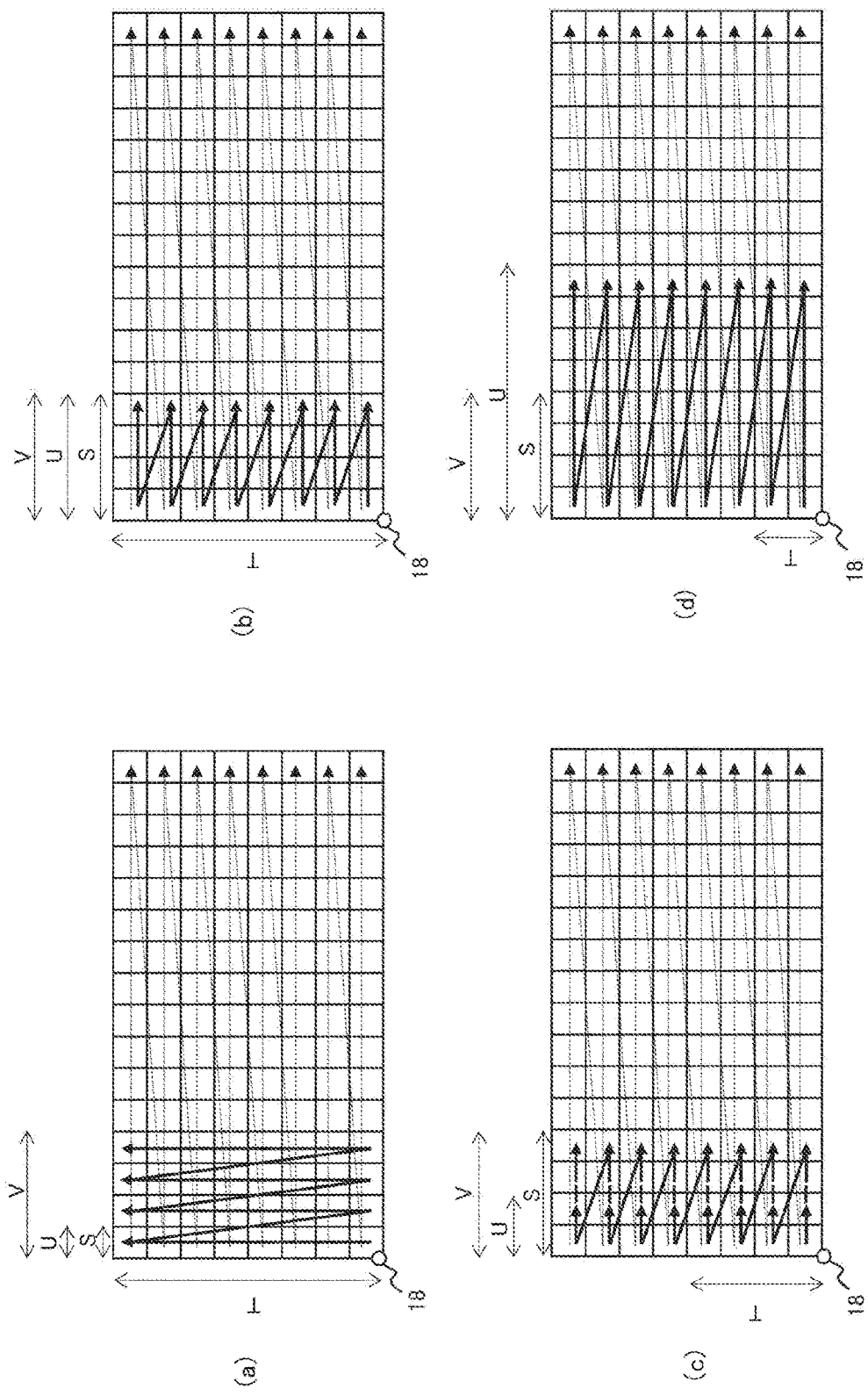
FIG. 16 exemplifies orders in which the compression/encoding section according to the present embodiment reads out data from the frame buffer in various cases.

FIG. 16 exemplifies an order in which the compression/encoding section 422 reads out data from the frame buffer 406 in various cases. The manner in which the figures are represented in four cases (a), (b), (c), and (d) is similar to those in FIG. 10, and the image generation section 420 writes pixel data in raster order. In addition, in a display panel, scanning in the up direction advances in the right direction from the bottom-left display start point 18 in the image plane.

Firstly, the case in (a) is a case in which the number of pixels T in the scan direction for a minimum unit region that a compression/decompression method to be employed can support matches the number of pixels in the scan direction for the image plane, a corresponding region width S is one pixel, the partial image width V that the server 400 can support is four pixels, and the readout width U is one pixel. At this time, as indicated by solid arrows, from the display start point 18, the compression/encoding section 422 advances, in the right direction, with a readout in the up direction in the image plane at a width of one pixel. The compression/encoding section 422 then, for example, performs compression and encoding for each single row of data to thereby set four rows worth of compressed and encoded data to be data for a partial image.

In contrast to the case in (a), the case in (b) is where a minimum unit region width S that the compression/decompression method can support is four pixels, and the readout width U is four pixels. At this time, as indicated by solid arrows, from the display start point 18, the compression/encoding section 422 advances, in the right direction, with a readout in the up direction in the image plane that is at a width of four pixels. The compression/encoding section 422 then, for example, performs compression and encoding for every four rows of data to thereby set this data to be data for a partial image.

In contrast to the case in (b), the case in (c) is where the number of pixels T in the scan direction for the minimum unit region that the compression/decompression method can support is halved, and the readout width U is set to two pixels. At this time, from the display start point 18, the compression/encoding section 422 advances, in the right direction, with a readout in the up direction in the image plane at a width of four pixels as in (b), but a readout for four pixels is performed after being divided into two memory accesses as indicated by a solid line and thick broken line arrows in (c). In addition, each time the readout in the up direction advances by only the number of pixels T, the compression/encoding section 422 can compress and encode the data that has been read out.

In contrast to the case in (c), the case in (d) is where the number of pixels T in the scan direction for the minimum unit region that the compression/decompression method can support is halved again, and the readout width U is set to eighth pixels. At this time, as indicated by solid arrows, from the display start point 18, the compression/encoding section 422 advances, in the right direction, with a readout in the up direction in the image plane that is at a width of eighth pixels. In addition, each time the readout in the up direction advances by only the number of pixels T, the compression/encoding section 422 can, at each four-pixel width, compress and encode the data that has been read out. Note that it may be that an additional memory is provided for the compression/encoding section 422, and, from among pieces of data read out at the width U, a portion for the next partial image is held until necessary, whereby a frequency of memory accesses is reduced.

Figure 17:
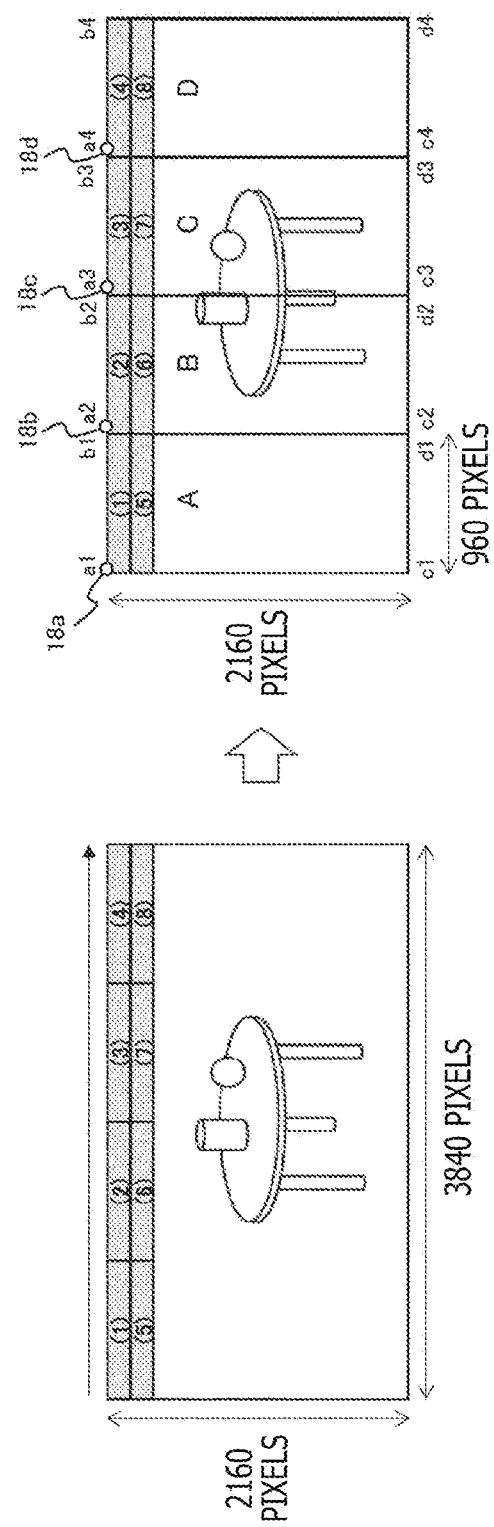
FIG. 17 is a view for describing an example of setting various parameters according to a handshake between the server and the image processing apparatus in the present embodiment.

FIG. 17 is a view for describing an example of setting various parameters according to a handshake between the server 400 and the image processing apparatus 200. A display panel here is configured as four partial panels A, B, C, and D connected to each other in the horizontal direction as illustrated on the right side of FIG. 17, and display start points 18a, 18b, 18c, and 18d are at the top-left for each partial panel. Note that the four corners of each partial panel in FIG. 17 are set to (a1, b1, c1, d1) (a2, b2, c2, d2), (a3, b3, c3, d3), and (a4, b4, c4, d4) in an order of top-left, top-right, bottom-left, and bottom-right. In a handshake, parameters such as the following are transmitted from the server 400.

Readout width U that can be supported: 4, 8, 16
Unit region width S that can be supported in compression/decompression method: 8, 16, 32
Number of pixels T in scan direction for unit region that can be supported in compression/decompression method: 32, 64
Maximum resolution with which drawing is possible: 4000×2160 pixels Meanwhile, regarding the display panel, parameters such as the following are transmitted from the image processing apparatus 200.

Overall display start point: a1
Scan direction: a1 to b1
Number of partial panels: 4
Number of partial panels to scan simultaneously or in parallel: 4
Number of partial panels that will perform consecutive scanning: 1
Scan order for partial panels: A, B, C, D
Side at upper end in panel: a1-b1

In addition, regarding details of processing, parameters such as the following are transmitted from the image processing apparatus 200.

Unit region width S that can be supported in compression/decompression method: 16
Number of pixels T in scan direction for unit region that can be supported in compression/decompression method: 50, 64
Partial image width V that can be supported: 32
Number of pixels in scan direction for minimum unit region for which scan control is possible: 960, 1000, 1024

In this case, as illustrated on the left side of FIG. 17, the compression/encoding section 422 in the server 400 forms partial images such that a boundary between partial panels is not straddled, and generates compressed and encoded data in the raster order from the top-left of the image. FIG. 17 indicates some partial images to be formed, by gray rectangular regions, and the processing order thereof is indicated by numbers. Here, in a case where an image having 4000×2160 pixels is set as a target and the size of a partial image is set to 1000×32, in order to form a unit region for compression and encoding by uniformly dividing the partial image, it is necessary to set the number of pixels T in the scan direction for a unit region to 50, etc. However, in the example described above, 64 pixels is selected as the number of pixels T because the number of pixels T on the server 400 side does not support 50 pixels. As a result, the number of pixels in the scan direction for a partial image becomes 960 pixels, as a multiple of 64 pixels.

By such a handshake, various parameters used in processing by the image generation section 420 or the compression/encoding section 422 are set as follows, for example.

Partial image generation order: a1 to b1, a2 to b2, a3 to b3, a4 to b4
Data order within partial image: parallel to and in same direction as scan direction
Partial image size (pixels): scan direction 960, width 32
Readout width U: 16
Minimum unit region width S for compression and encoding: 16
Number of pixels T in scan direction for minimum unit region for compression and encoding: 64
Drawing resolution (pixels): 3840×2160

As a result, the image processing apparatus 200 processes each item of partial image data as with the gray rectangular regions transmitted from the server 400, and outputs each item of partial image data to each partial panel in the display panel in the order indicated by numbers.

Figure 18:
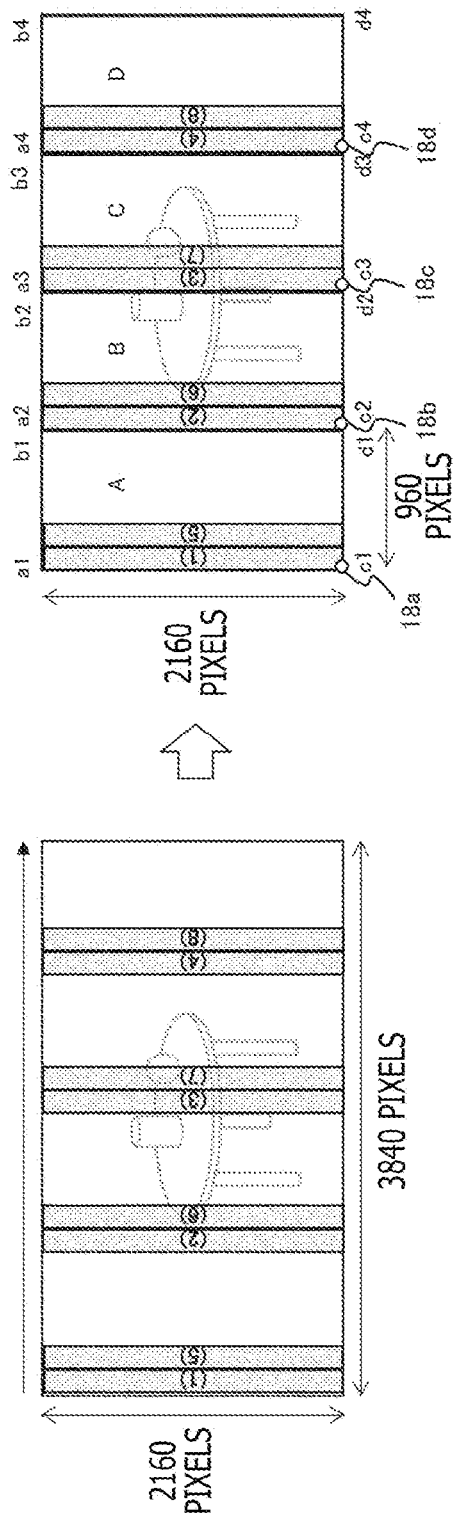
FIG. 18 is a view for describing another example of setting various parameters according to a handshake between the server and the image processing apparatus in the present embodiment.

FIG. 18 is a view for describing another example of setting various parameters according to a handshake between the server 400 and the image processing apparatus 200. The configuration of a display panel illustrated on the right side of FIG. 18 is the same as that in FIG. 17, but a state in which display start points 18a, 18b, 18c, and 18d for each partial panel are at the bottom-left and scanning in the up direction from there advances in the right direction is entered. If the other conditions are the same, information transmitted from the server 400 in a handshake does not change from the case illustrated in FIG. 17.

Meanwhile, regarding the display panel, parameters such as the following are transmitted from the image processing apparatus 200.

Overall display start point: c1
Scan direction: c1 to a1
Number of partial panels: 4
Number of partial panels to scan simultaneously or in parallel: 4
Number of partial panels that will perform consecutive scanning: 1
Scan order for partial panels: A, B, C, D
Side at upper end in panel c1-a1

Regarding details of processing, information transmitted from the image processing apparatus 200 does not change from the case illustrated in FIG. 17. As a result, various parameters used in processing by the image generation section 420 or the compression/encoding section 422 are set as follows, for example.

Partial image generation order: c1 to a1, c2 to a2, c3 to a3, c4 to a4
Data order within partial image: parallel to and in same direction as scan direction
Partial image size (pixels): scan direction 2160, width 32
Readout width U: 16
Minimum unit region width S for compression and encoding: 16
Number of pixels T in scan direction for minimum unit region for compression and encoding: 64
Drawing resolution (pixels): 3840×2160

In this case, as illustrated on the left side of FIG. 18, the compression/encoding section 422 in the server 400, for example, forms partial images as with the gray rectangular regions, and generates compressed and encoded data in the order indicated by numbers. In other words, partial images are formed such that four regions are circulated between, in the right direction from the left end of respective regions corresponding to the partial panels. As a result, the image processing apparatus 200 sequentially processes partial images transmitted from the server 400 in an order as indicated by the numbers, and the partial images are outputted to respective partial panels in the display panel in this order.

By virtue of the present embodiment described above, in a system having a mode in which data for a moving image is transferred to the image processing apparatus 200 which is a client, the server 400 which is a transfer source obtains information pertaining to a scan order for a display panel for the client, and, in an order that corresponds thereto, forms data to be transmitted. As a result, it is possible for readout from a frame buffer, compression and encoding, transfer, decoding and decompression by the client, and image processing to be caused to progress by prioritizing data that, in terms of display, will be necessary earlier. In particular, by performing such processing in parallel in units of partial images obtained by dividing a frame plane, display of video at low delay regardless of the scan order of a display panel becomes possible.

As a result, it is possible to realize stable display on various display apparatuses or terminals, such as a display that scans a horizontally-long screen in a vertical direction, a portable terminal having a format in which the orientation of an image to be displayed is switched according to an orientation in which the user is grasping the portable terminal, or a display configured by a plurality of panels. In addition, by not only forming partial images in an order aligned with the scan order of a display panel but also by switching, according to an order of processing on the client side, the order of reading out pixel data included in each partial image from a frame buffer, it is possible to constrain pixel data wait time or memory access time to a minimum and realize further lowering of delay.

Description has been given based on an embodiment of the present invention. The embodiment is an example, and a person skilled in the art would understand that various variations can be made to combinations of respective components or processing processes of the embodiment and that these variations are within the scope of the present invention.

INDUSTRIAL APPLICABILITY

The present invention as above can be used for, for example, various devices such as an image data transfer apparatus, a content server, an image processing apparatus, or a content processing apparatus, or a system that includes any one of these.

REFERENCE SIGNS LIST

1: Image display system
100: Head-mounted display
200: Image processing apparatus
240: Image data obtainment section
242: Decoding/decompression section
243: Connection position control section
244: Image processing section
246: Display control section
247: Display method obtainment section
302: Flat panel display
303: Portable terminal
400: Server
406: Frame buffer
420: Image generation section
422: Compression/encoding section
423: Processing order control section
424: Packetization section
426: Communication section

The invention claimed is:

1. An image data transfer apparatus that transfers data for a moving image to a client terminal, comprising:
circuitry configured to:
generate data for a frame included in the moving image and write the data for the frame to a memory;
obtain information pertaining to a scan order for a plurality of partial panels of a display panel connected to the client terminal;
read out pixel data for the frame from the memory in an order based on the information pertaining to the scan order;
switch the order of reading out the pixel data from the memory according to the scan order for the plurality of partial panels;
compress and encode the pixel data; and
perform a streaming transfer of compressed and encoded frame data to the client terminal.

2. The image data transfer apparatus according to claim 1, the circuitry further configured to: transfer the compressed and encoded frame data in an order determined on the basis of the information pertaining to the scan order.

3. The image data transfer apparatus according to claim 1, the circuitry further configured to:
obtain information pertaining to an orientation of the display panel, and
cause the order of reading out the pixel data from the memory to change in response to change of the orientation of the display panel.

4. The image data transfer apparatus according to claim 1, wherein, in the reading out of the pixel data, setting a predetermined number of consecutive pixels as a readout unit and causing a readout at that width to progress in a direction corresponding to a scan direction for the display panel.

5. The image data transfer apparatus according to claim 1, wherein, in the reading out of the pixel data, setting a predetermined number of consecutive pixels as a readout unit and causing a readout at that width to progress in a direction based on a processing order for the pixel data in the client terminal.

6. The image data transfer apparatus according to claim 4, the circuitry further configured to: compress and encode the frame data in units of partial images having a width that is N times (N is a natural number) the number of pixels for the readout unit.

7. The image data transfer apparatus according to claim 6, the circuitry further configured to:
obtain information pertaining to a width of a corresponding one of the partial images that is capable of being processed by the client terminal, a width of a minimum unit region for which scan control by the display panel is possible, and a minimum width of a unit region that a compression/encoding method is capable of supporting, and
determine the width of the corresponding one of the partial images on a basis of the information.

8. The image data transfer apparatus according to claim 4, the circuitry further configured to: set the number of pixels for the readout unit to be a bus width used to access the memory or a natural number multiple of a memory access width.

9. The image data transfer apparatus according to claim 6, the circuitry further configured to:
obtain information pertaining to a capacity of a buffer memory for the partial images in the client terminal, and
on a basis of a jitter for an amount of processing time required until display to the display panel, calculate the number of the partial images necessary for buffering in the client terminal, and determines a data size for the partial images according to this number and the capacity of the buffer memory.

10. The image data transfer apparatus according to claim 1, wherein a handshake with the client terminal is used to determine a resolution of a frame to draw and a format of pixel data.

11. The image data transfer apparatus according to claim 1, the circuitry further configured to form partial images such that a boundary for the partial panels is not straddled.

12. The image data transfer apparatus according to claim 1, the circuitry further configured to control such that a minimum unit for compression and encoding does not straddle a boundary for the partial panels.

13. The image data transfer apparatus according to claim 1, the circuitry further configured to divide and perform compression and encoding on an image that each partial panel is to be caused to display.

14. An image display system comprising:
  a server that transfers data for a moving image; and
  a client terminal that receives the data for the moving image and causes a display panel to display the data for the moving image, wherein
  the client terminal is provided with
  a display method obtainment section that obtains information pertaining to a scan order for a display panel connected to the client terminal and that transmits the information to the server, and
  the server is provided with
  a drawing section that generates data for a frame included in the moving image and writes the data to a memory,
  a display method information obtainment section that obtains information pertaining to the scan order for a plurality of partial panels of the display panel connected to the client terminal,
  a compression/encoding section that reads out pixel data for the frame from the memory in an order based on the information pertaining to the scan order and compresses and encodes the pixel data, wherein according to the scan order for the plurality of partial panels, switch the order of reading out the pixel data from the memory, and
  a communication section that performs a streaming transfer of compressed and encoded frame data to the client terminal.

15. An image data transfer method comprising:
  by an image data transfer apparatus that transfers data for a moving image to a client terminal, generating data for a frame included in the moving image and writing the data to a memory;
  obtaining information pertaining to a scan order for a plurality of partial panels of a display panel connected to the client terminal;
  reading out pixel data for the frame from the memory in an order based on the information pertaining to the scan order and compressing and encoding the pixel data;
  switching the order of reading out the pixel data from the memory according to the scan order for the plurality of partial panels; and
  performing a streaming transfer of compressed and encoded frame data to the client terminal.

16. A non-transitory, computer-readable storage medium containing a computer program, which when executed by a computer, causes the computer to perform a data transfer process to transfer data for a moving image to a client terminal, by carrying out actions, comprising:
  generating data for a frame included in the moving image and writing the data to a memory;
  obtaining information pertaining to a scan order for a plurality of partial panels of a display panel connected to the client terminal;
  reading out pixel data for the frame from the memory in an order based on the information pertaining to the scan order and compressing and encoding the pixel data;
  switching the order of reading out the pixel data from the memory according to the scan order for the plurality of partial panels; and
  performing a streaming transfer of compressed and encoded frame data to the client terminal.

* * * * *